US012663800B2

(12) United States Patent (10) Patent No.: US 12,663,800 B2
Niiuchi et al. (45) Date of Patent: Jun. 23, 2026

(54) REMOTE ASSISTANCE APPARATUS, REMOTE ASSISTANCE SYSTEM, PROGRAM, AND REMOTE ASSISTANCE METHOD

(71) Applicant: DENSO CORPORATION, Kariya-city (JP)

(72) Inventors: Shota Niiuchi, Kariya-city (JP); Yasunobu Sugiura, Kariya-city (JP); Masato Matsumoto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 60 days.

(21) Appl. No.: 18/750,976

(22) Filed: Jun. 21, 2024

(65) Prior Publication Data

US 2024/0345588 A1 Oct. 17, 2024

Related U.S. Application Data

(63) Continuation of application No. PCT/JP2022/047781, filed on Dec. 23, 2022.

(30) Foreign Application Priority Data

Dec. 27, 2021 (JP) ................................. 2021-213094

(51) Int. Cl.
*G05D 1/224* (2024.01)
*B60K 35/28* (2024.01)
*G05D 109/10* (2024.01)
(52) U.S. Cl.
CPC ........... *G05D 1/2247* (2024.01); *B60K 35/28* (2024.01); *B60K 2360/119* (2024.01);
(Continued)

(58) Field of Classification Search
CPC .. B60R 1/22; B60R 1/26; B60K 35/23; B62D 15/0285; H04N 5/272
See application file for complete search history.

(56) References Cited

U.S. PATENT DOCUMENTS

| | | | | |
|---|---|---|---|---|
| 8,947,454 | B2 * | 2/2015 | Hashikawa | ............ B60K 35/23 |
| | | | | 340/425.5 |
| 2022/0001813 | A1 * | 1/2022 | Matsushita | ............... B60R 1/26 |

FOREIGN PATENT DOCUMENTS

| | | | | | |
|---|---|---|---|---|---|
| CN | 109070824 | A | * 12/2018 | ............. | H04N 5/272 |
| DE | 102018133040 | A1 | * 8/2019 | ......... | B62D 15/0285 |
| JP | 2010-061346 | A | 3/2010 | | |

* cited by examiner

*Primary Examiner* — Yuri Kan
(74) *Attorney, Agent, or Firm* — Precision Patents, P.C.

(57) ABSTRACT

A remote assistance device includes an obtainer, a display, a control information generator, and a display controller. The obtainer receives image information from a target vehicle that is remotely operated. The image information includes an image produced by capturing a surround view of the target vehicle. The display shows the image derived by the obtainer, to a remote driver. The control information generator cyclically produces control information including a controlled variable which is created by an operation input from the remote driver to control a given operation of the target vehicle. The control information generator transmits the control information to the target vehicle. The display controller works to control an operation of the display to overlay an auxiliary image on the image on the display. The auxiliary image includes at least a measure of the controlled variable provided when the image was captured in the target vehicle and is used for assisting the remote driver in remotely maneuvering the target vehicle.

1 Claim, 20 Drawing Sheets

(52) U.S. Cl.
CPC .. *B60K 2360/168* (2024.01); *B60K 2360/176*
(2024.01); *B60K 2360/188* (2024.01); *G05D*
*2109/10* (2024.01)

FIG.9

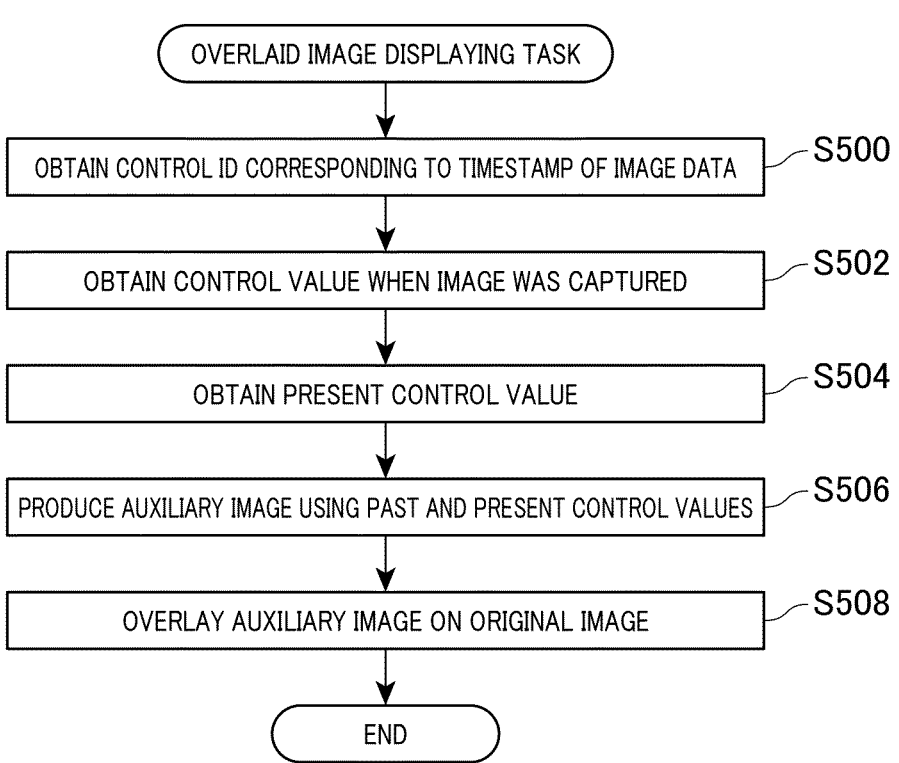

```
OVERLAID IMAGE DISPLAYING TASK
              │
              ▼
OBTAIN CONTROL ID CORRESPONDING TO TIMESTAMP OF IMAGE DATA ─── S500
              │
              ▼
OBTAIN CONTROL VALUE WHEN IMAGE WAS CAPTURED ─── S502
              │
              ▼
OBTAIN PRESENT CONTROL VALUE ─── S504
              │
              ▼
PRODUCE AUXILIARY IMAGE USING PAST AND PRESENT CONTROL VALUES ─── S506
              │
              ▼
OVERLAY AUXILIARY IMAGE ON ORIGINAL IMAGE ─── S508
              │
              ▼
             END
```

FIG.10A

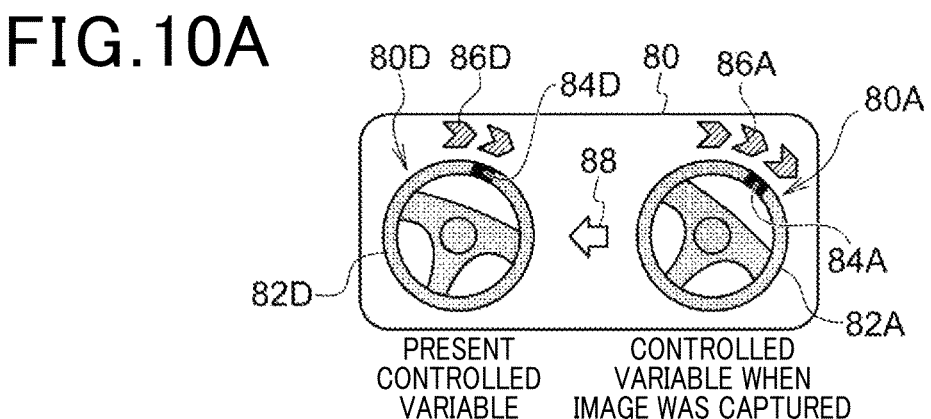

PRESENT CONTROLLED VARIABLE

CONTROLLED VARIABLE WHEN IMAGE WAS CAPTURED

FIG.10B

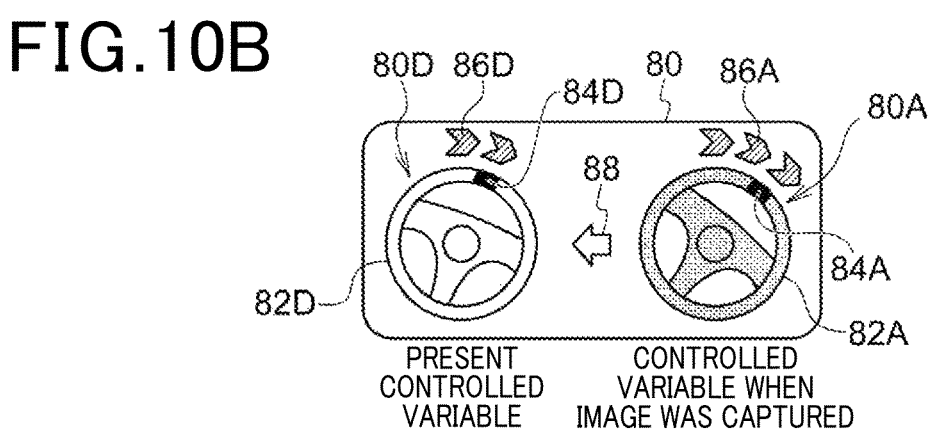

PRESENT CONTROLLED VARIABLE

CONTROLLED VARIABLE WHEN IMAGE WAS CAPTURED

CONTROLLED
VARIABLE WHEN
IMAGE WAS CAPTURED

PRESENT
CONTROLLED
VARIABLE

CONTROLLED VARIABLE WHEN
IMAGE WAS CAPTURED

PRESENT CONTROLLED
VARIABLE 80D      90D      80A      90A 120D      120A      130A

130A1     130A2     130A3

130A4     130A5     130A6

90D  90    90A    80D  80  80A        100

| GREEN | BLUE | YELLOW | ORANGE | RED |

100 ms          200 ms          300 ms

HIGHER
TRANSMISSION LAG

——— : INSTANTANEOUS VALUE

▬▬ ▬▬ ▬▬ : AVERAGE

LAG TIME

THRESHOLD

TIME

REMOTE ASSISTANCE APPARATUS, REMOTE ASSISTANCE SYSTEM, PROGRAM, AND REMOTE ASSISTANCE METHOD

CROSS REFERENCE TO RELATED DOCUMENT

The present application claims the benefit of priority of Japanese Patent Application No. 2021-213094 filed on Dec. 27, 2021, the disclosure of which is incorporated in its entirety herein by reference.

TECHNICAL FIELD

This disclosure relates generally to a remote assistance apparatus, a remote assistance system, a program, and a remote assistance method.

BACKGROUND ART

Various types of remote assistance systems are being developed which display an image of a surround view of a target vehicle, as derived from the target vehicle, to a remote driver to enable the remote driver to assist in driving the target vehicle in a remote mode. Such a type of remote assistance systems have a risk that it may be difficult for the remote driver to detect a required controlled variable due to a lag in transmission of the image from the target vehicle to the remote driver.

A First Patent Literature discloses a remote assistance system which includes a mobile object, a display, and remote assistance device. The mobile object has mounted thereon an image capturing device working to capture an image of a region where the mobile object is moving. The display shows the image obtained by the image capturing device. The remote assistance device is equipped with an operation unit working to analyze the image on the display to drive the mobile object in a remote mode. The remote assistance device includes a lag time calculator, a mobile position calculator, and an image overlay device. The lag time calculator works to calculate a lag time in communication between the mobile object and the remote assistance device. The mobile position calculator works to calculate a position of the mobile object at a time when the mobile object is expected to be remotely controlled by the remote assistance device as a function of a route along which the mobile object is expected to move for a given period of time after the remote assistance device receives the image from the mobile object, the speed of the mobile object, and the calculated lag time. The image overlay device works to overlay a turn reference point in relation to the calculated position of the mobile object on the image on the display.

PRIOR ART DOCUMENT

Patent Literature

FIRST PATENT LITERATURE: Japanese Patent First Publication No. 2010-61346

SUMMARY OF THE INVENTION

The techniques taught in First Patent Literature have been developed in light of the lag time in communication between the mobile object and the remote assistance device, but however, work only to show the position of the mobile object which is expected at a time when present instructions will arrive at the mobile object and do not show process of a control mode of the mobile object during the lag time, such as how the mobile object was controlled when the image was captured and how long the controlled mobile object was moved.

The inventors of this application have found a risk that a control value produced by the remote assistance device may not yet have arrived at the mobile object at a time when an image is actually displayed to the remote driver, but the remote driver who is unskilled in understanding a delayed image might misunderstand and think that the control value has already arrived at the mobile object and was insufficient, which may cause the remote driver to strengthen his or her vehicle control action undesirably.

It is an object of this disclosure to provide a remote assistance device, a remote assistance system, a program, or a remote assistance method which enables a remote driver to perceive a controlled variable provided when an image displayed to the remote driver was captured, and also detect a gap between a measure of the controlled variable used when the image was captured and the latest measure of the controlled variable.

According to one aspect of this disclosure, there is provided a remote assistance device which comprises: (a) an obtainer which obtains image information from a target vehicle that is remotely operated, the image information being information including an image produced by capturing a surround view of the target vehicle; (b) a display which shows the image, as included in the image information derived by the obtainer, to a remote driver; (c) a control information generator which cyclically produces control information including a controlled variable which is created by an operation input from the remote driver to control a given operation of the target vehicle, the control information generator transmitting the control information to the target vehicle; and (d) a display controller which controls an operation of the display to overlay an auxiliary image on the image displayed to the remote driver. The auxiliary image includes at least the controlled variable provided when the image was captured in the target vehicle and is used for assisting the remote driver in remotely maneuvering the target vehicle.

According to the second aspect of this disclosure, there is provided a program which causes a computer to function as: (a) an obtainer which obtains image information from a target vehicle that is remotely operated, the image information being information including an image produced by capturing a surround view of the target vehicle; (b) a control information generator which cyclically produces control information including a controlled variable which is created by an operation input from a remote driver to control a given operation of the target vehicle, the control information generator transmitting the control information to the target vehicle; (c) a display controller which controls an operation of a display to overlay an auxiliary image on the image which is derived by the obtainer and displayed to the remote driver. The auxiliary image includes at least the controlled variable provided when the image was captured in the target vehicle and being used for assisting the remote driver in remotely maneuvering the target vehicle.

According to the third aspect of this disclosure, there is provided a remote assistance system which comprises: (a) a target vehicle which is driven in a remote mode; and (b) a remote assistance device which includes, (b1) an obtainer which obtains image information from a target vehicle, the image information including an image produced by capturing a surround view of the target vehicle, (b2) a display which shows the image, as included in the image information derived by the obtainer, to a remote driver, (b3) a control information generator which cyclically produces control information including a controlled variable which is created by an operation input from the remote driver to control a given operation of the target vehicle, the control information generator transmitting the control information to the target vehicle, and (b4) a display controller which controls an operation of the display to overlay an auxiliary image on the image shown on the display, the auxiliary image including at least the controlled variable provided when the image was captured in the target vehicle and being used for assisting the remote driver in remotely maneuvering the target vehicle. The target vehicle includes, (a1) an image capturing device which captures an image of a surround view of the target vehicle, (a2) an image data transmitter which transmits image data including the image captured by the image capturing device to the remote assistance device, (a3) a vehicle controller which receives the control information from the remote assistance device to control an operation of the target vehicle using the received control information, and (a4) a linking device which generates linking information about correspondence or linkage between the image information and the control information provided when the image was captured by the image capturing device and outputs the linking information to the remote assistance device. The display controller of the remote assistance device analyzes the linking information obtained from the target vehicle to identify the control information which is provided when the image was captured and corresponds to the image information derived by the obtainer.

According to the fourth aspect of this disclosure, there is provided a remote assistance method in which a vehicle works to obtain image information including an image of a surround view of a target vehicle which is captured by an image capturing device and transmits the image information to a remote assistance device, to receive control information from the remote assistance device to control an operation of the target vehicle using the control information, and to generate linking information which links the image information with the control information provided when the image was captured and transmit the linking information to the remote assistance device, and in which the remote assistance device works to obtain, from the target vehicle, the image information representing the image of the surround view of the target vehicle, to cyclically produce control information including a controlled variable which is created by an operation input from a remote driver to control a given operation of the target vehicle, to transmit the control information to the target vehicle, to obtain the linking information which links the image information with the control information provided when the image was captured, to analyze the linking information to identify the control information which was provided when the image was captured and pertains to the image shown on a display, and to overlay an auxiliary image on the image shown on the display, the auxiliary image including at least the controlled variable provided when the image was captured in the target vehicle and being used for assisting the remote driver in remotely maneuvering the target vehicle.

BRIEF DESCRIPTION OF THE DRAWINGS

The above-described object, other objects, features, or beneficial advantages in this disclosure will be apparent from the following detailed discussion with reference to the drawings.

In the drawings:

FIG. 9 is a flowchart of a sequence of steps of an image overlay task illustrated in FIG. 8;

FIG. 10A is a view which demonstrates the first example of icons representing controlled steering variables included in an auxiliary image;

FIG. 10B is a view which demonstrates the second example of icons representing controlled steering variables included in an auxiliary image;

MODE FOR CARRYING OUT THE INVENTION

Embodiments of this invention will be described below with reference to the drawings.

First Embodiment

A remote assistance system in this disclosure will be described below. The remote assistance system is a system in which a remote operator or driver is responsive to an assistance request from an autonomous vehicle (also called a self-driving vehicle), which will also be simply referred to as a target vehicle, to remotely control an operation of the target vehicle.

Figure 1:
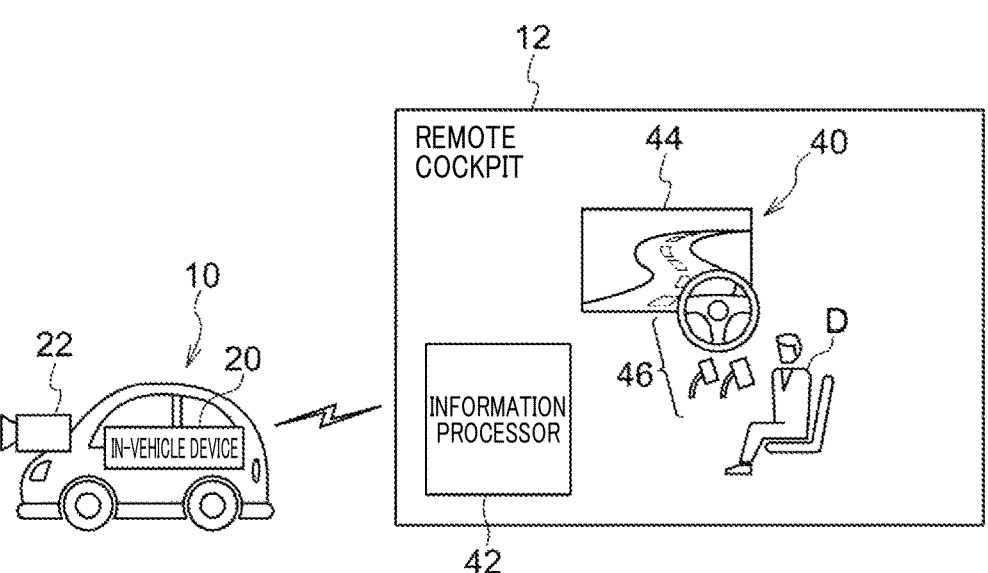
FIG. 1 is a schematic view which shows an example of a structure of a remote assistance system according to an embodiment of this disclosure.

The remote assistance system in this embodiment, as illustrated in FIG. 1, includes the vehicle 10 and the remote assistance device 40 installed in the remote cockpit 12 of a control center. The vehicle 10 is connected to a public network, such as the internet, through a wireless base station. The vehicle 10 communicates with the remote assistance device 40 connected to the network.

The vehicle 10 is equipped with the in-vehicle device 20 and the camera 22, such as an in-vehicle camera, which captures an image of a surround view of the vehicle 10. The in-vehicle device 20 is implemented by an information processor, such as an electronic control unit (ECU) installed in the vehicle 10. The in-vehicle device 20 has a control feature, not shown, to control an autonomous driving operation. The control feature works to control a variety of mechanisms installed in the vehicle 10 to move the vehicle 10 to a destination along a selected travel route in an autonomous driving mode.

The in-vehicle device 20 transmits image data, as derived by the camera 22, and information about a speed of the vehicle 10 and/or a position of vehicle 10 to the remote assistance device 40. When it is required to perform a remote operation through the remote driver D, the in-vehicle device 20 requests the remote assistance device 40 for assistance.

The remote assistance device 40 is a device working to provide remote assistance to the vehicle 10. The remote assistance device 40 includes the information processing unit 42 serving as a remote assistance server, the display 44 and the operation unit 46. The display 44 provides an image of surroundings of the vehicle 10 to the remote driver D. The operation unit 46 is a unit manipulated or operated by the remote driver D.

The information processing unit 42 obtains image data or vehicle information from the in-vehicle device 20 and shows an image, as derived by processing the image data, on the display 44. When receiving an assistance request from the in-vehicle device 20, the information processing unit 42 instructs the remote driver D to perform a driving operation of the vehicle 10 in a remote mode. Specifically, the remote driver D controls a steering wheel and/or a pedal installed in the operation unit 46 while watching the image on the display 44 to control the driving of the vehicle 10 in the remote mode. When the vehicle 10 is being operated in the remote mode, the information processing unit 42 analyzes parameters inputted by the remote driver D thereinto to produce and output a plurality of pieces of control information to the in-vehicle device 20.

Displayed Image

Figure 2:
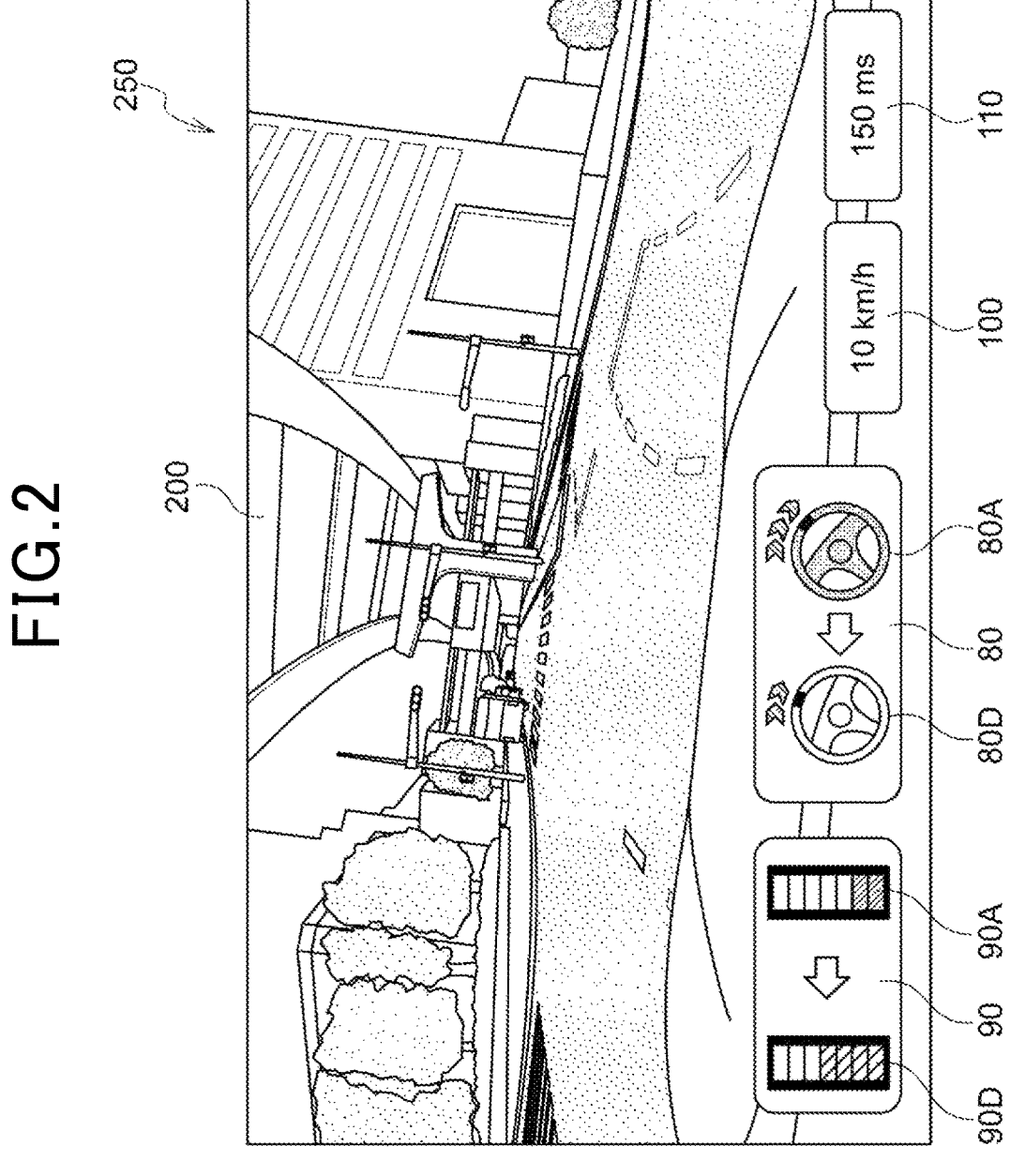
FIG. 2 is a view which demonstrates an example of an image on which an auxiliary image is overlaid which includes vertically or laterally parallel-arranged indicators representing a past piece of control information used when an image was captured and a present piece of control information produced most recently.

The remote assistance system in this disclosure, as can be seen in FIG. 2, works to overlay an auxiliary image on the image shown to the remote driver D. The auxiliary image is an image used to assist the remote driving operation made by the remote driver D. Specifically, the auxiliary image is an image which is produced at least using a piece of the control information derived when the camera 22 has captured an image, preferably, using both a past piece of the control information used in the vehicle 10 when the camera 22 has captured an image and the latest piece of the control information (which will also be referred to as present control information). The "present control information", as referred to herein, is a piece of the control information derived in the latest one of the control cycles. The control information, as described later in detail, contains control values (which will also be referred to as control parameters) of steering, acceleration, and/or deceleration of the vehicle 10. The control values represent variables expected to be controlled (which will also be referred to as a to-be-controlled variable, simply as a controlled variable). In order for the remote driver D to immediately perceive the controlled variables, the auxiliary image indicates each of the controlled variable using an icon.

In the example demonstrated in FIG. 2, the displayed image 250 includes the original image 200 and a set of indicators: the controlled steering variable indicator 80, the controlled acceleration/deceleration variable indicator 90, the vehicle speed indicator 100 representing the speed of the vehicle 10 derived when the camera 22 has captured the original image 200, and the displaying lag time indicator 110 which are displayed on the original image 200 in the form of an auxiliary image. The controlled steering variable indicator 80 includes the icon 80A and the icon 80D. The icon 80A represents a controlled steering variable required at a time when the original image 200 has been captured. The icon 80D represents a controlled steering variable required currently. Similarly, the controlled acceleration/deceleration variable indicator 90 includes the icon 90A and the icon 90D. The icon 90A represents a controlled acceleration/deceleration variable required when the original image 200 has been captured. The icon 90D represents a controlled acceleration/deceleration variable required currently. The speed of the vehicle 10 and the lag time are denoted by numerical numbers. The auxiliary image will also be described later in detail.

Usually, actual displaying of an image is delayed after the image is captured. This requires the remote driver D to watch a past image displayed and estimate a near-future condition of the vehicle 10. It is, however, difficult for the remote driver D to immediately determine a controlled variable required to meet the estimated condition of the vehicle 10, which leads to a risk that the remote driver D may perform an incorrect control operation on the vehicle 10. For instance, when the remote driver D turns the steering wheel clockwise, but the vehicle 10 appears not to turn right on the image, there is a risk that the remote driver D may additionally turn the steering wheel even further clockwise. In other words, a control value does not yet arrive at the vehicle 10 at a time when an image is actually displayed to the remote driver D, but the remote driver D might misunderstand and think that the control value has already arrived at the vehicle 10 and the control value was insufficient, which may cause the remote driver D to strengthen his or her vehicle control action undesirably.

The remote assistance system in this disclosure provides a displayed image to the remote driver D on which icons representing controlled variables required when an original image has been captured are additionally indicated, thereby enabling the remote driver D to visually perceive the controlled variables that are factors causing a series of moves of a currently displayed vehicle. It is possible for the remote driver D to analyze the already outputted controlled variables to determine that there is no need to turn the steering wheel currently, thereby eliminating the above risk that the remote driver D may perform an incorrect control operation on the vehicle 10. The displayed image shows the icons which represent both the controlled variables required when the original image has been captured and the control variables required currently, thereby enabling the remote driver D to detect a gap between one of the controlled variables produced when the original image has been captured and a corresponding one of the currently produced controlled variables.

Linking Information

The overlay of controlled variables produced when an image has been captured on that image displayed essentially requires linking between image data and control information produced when the image has been captured. In this embodiment, when an image has been captured, the in-vehicle device 20 produces linking information about correspondence or linkage between data on the image and the control information produced when the image has been captured and outputs the linking information to the remote assistance device 40.

Figure 3:
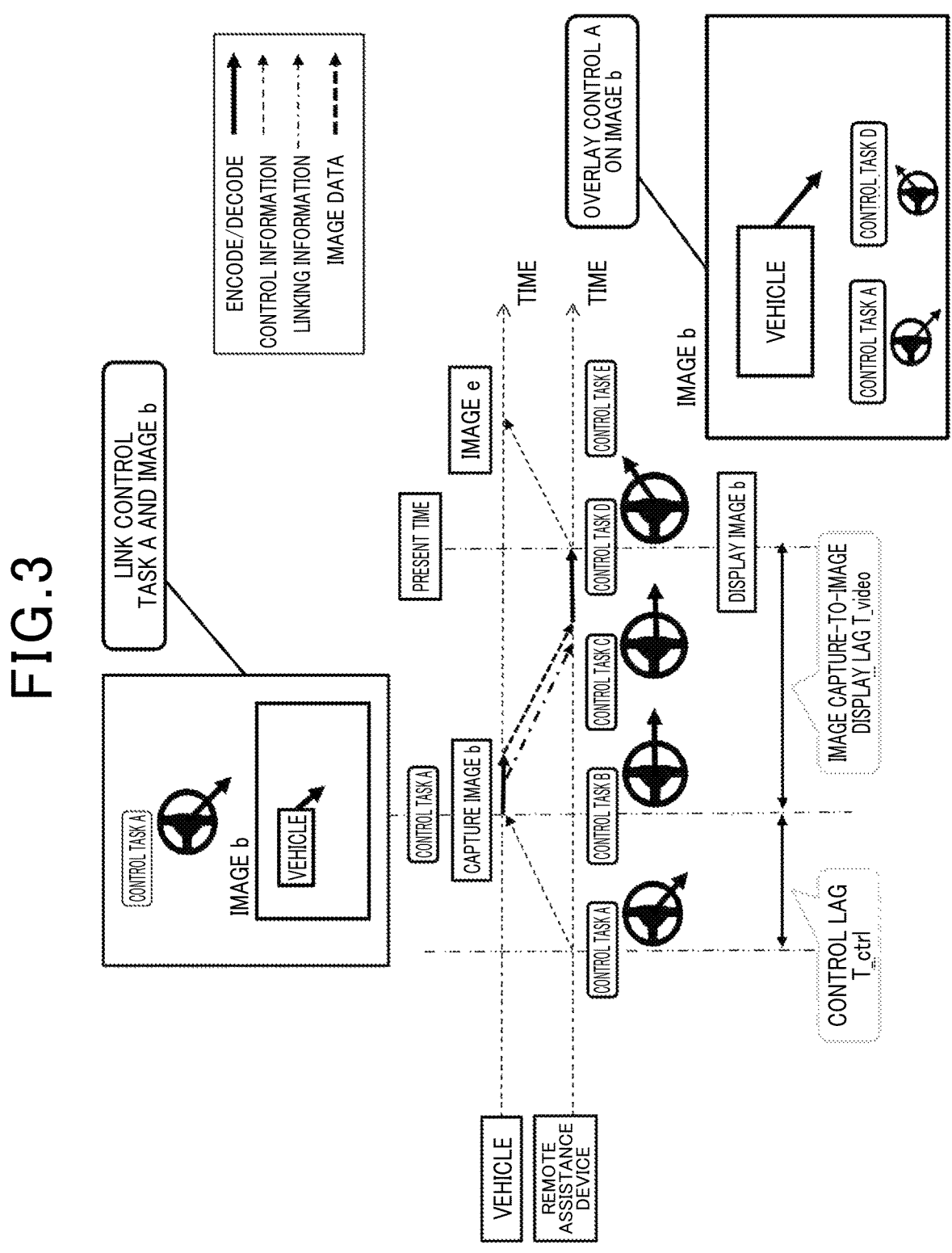
FIG. 3 is a conceptual diagram which illustrates a remote assistance method in this disclosure.

For instance, referring to FIG. 3, the remote driver D located at a remote side (i.e., the remote cockpit 12) performs a control task A. The control information about the control task A is outputted from the remote side and then arrives at the vehicle 10. The vehicle 10 performs a control operation instructed by the control task A. The image b that is an image captured by the vehicle 10 performing the control operation. Data on the image b is encoded in the vehicle 10 and then transmitted to the remote side. The remote side then decodes the data on the image b, as transmitted from the vehicle 10, and displays the image b. In the following discussion, the time when the image b is displayed is defined as a present time. At the present time, the remote driver D is performing the control task D at the remote side. In this example, the data on the image b is linked to the control information about the control task A. The displayed image b visually overlays a controlled variable required or used in the control task A and a control variable used in the control task D in the form of images.

A period of time between when the control information about the control task A is produced at the remote side and when the control information about the control task A arrives at the vehicle 10 will be referred to as a control lag T_ctrl. A period of time between when the data on the image b is produced and when the image b is actually displayed will be referred to as an image-transmission lag or simply referred to as an image lag T_video. Each of the control lag T_ctrl and the image lag T_video is usually variable depending upon a state of communication between the remote side and the vehicle 10. In order to alleviate such a drawback, this embodiment links the image data to the control information about a corresponding one of the control tasks, as received at a time when the image has been captured in the vehicle 10, to minimize any risks arising from the lag of communication between the remote side and the vehicle 10 or a variation thereof.

Electrical Structure of Device

Figure 4:
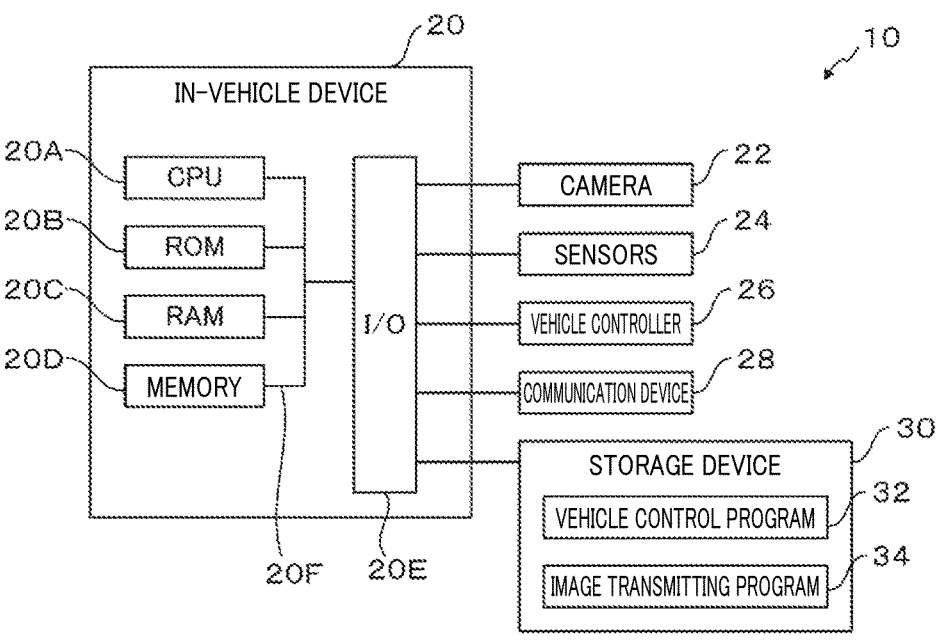
FIG. 4 is a block diagram which illustrates an example of an electrical structure of an in-vehicle device.

An example of an electrical structure of the vehicle 10 will be described below. The vehicle 10, as clearly illustrated in FIG. 4, includes the in-vehicle device 20, the camera 22, the sensors 24, the vehicle controller 26, the communication device 28, and the storage device 30. The in-vehicle device 20 serves as an information processor, such as an ECU. The in-vehicle device 20 includes the CPU (Central Processing Unit) 20A, the ROM (Read Only Memory) 20B, the RAM (Random Access Memory) 20C, the non-volatile memory 20D, and the input and output (I/O) device 20E which are mutually connected using the bus 20F. The camera 22, the sensors 24, the vehicle controller 26, the communication device 28, and the storage device 30 are connected to the I/O device 20E.

The CPU 20A reads a program from the storage device 30 and executes the program using the RAM 20C as a workspace. Specifically, the CPU 10A works to control operations of devices connected to the I/O device 20E and arithmetic operations according to the program stored in the storage device 30.

The camera 22 is used as an in-vehicle camera to capture an image of surroundings, such as front and side views of the vehicle 10. The vehicle 10 may be equipped with a plurality of cameras 22. The sensors 24 may include a millimeterwave radar detecting obstacles around the vehicle 10, a LIDAR (Light Detection and Ranging/Laser Imaging Detection and Ranging) detecting obstacles around the vehicle 10, a GPS (Global Positioning System) working to derive a present position of the vehicle 10, and/or a microphone detecting ambient sound around the vehicle 10. The GPS may be used to derive a standard time.

The vehicle controller 26 works as a control device to analyze the control information received from the remote side to control operations of devices or mechanisms installed in the vehicle 10 to achieve remote driving of the vehicle 10. The communication device 28 is used as a communication interface to achieve communication with an external device (i.e., the remote assistance device 40) using, for example, dedicated short-range communication standards, such as Wi-Fi, LTE (Long Term Evolution), or wide-area communication standards, such as 4G or 5G.

The storage device 30 is made of an external storage memory other than a HDD (Hard Disc Drive). The storage device 30 stores a variety of programs or data therein. In this embodiment, the storage device 30 retains therein the vehicle control program 32 and the image transmission program 34 which are executed to perform a vehicle control task and an image transmitting task, as will be described later in detail.

Figure 5:
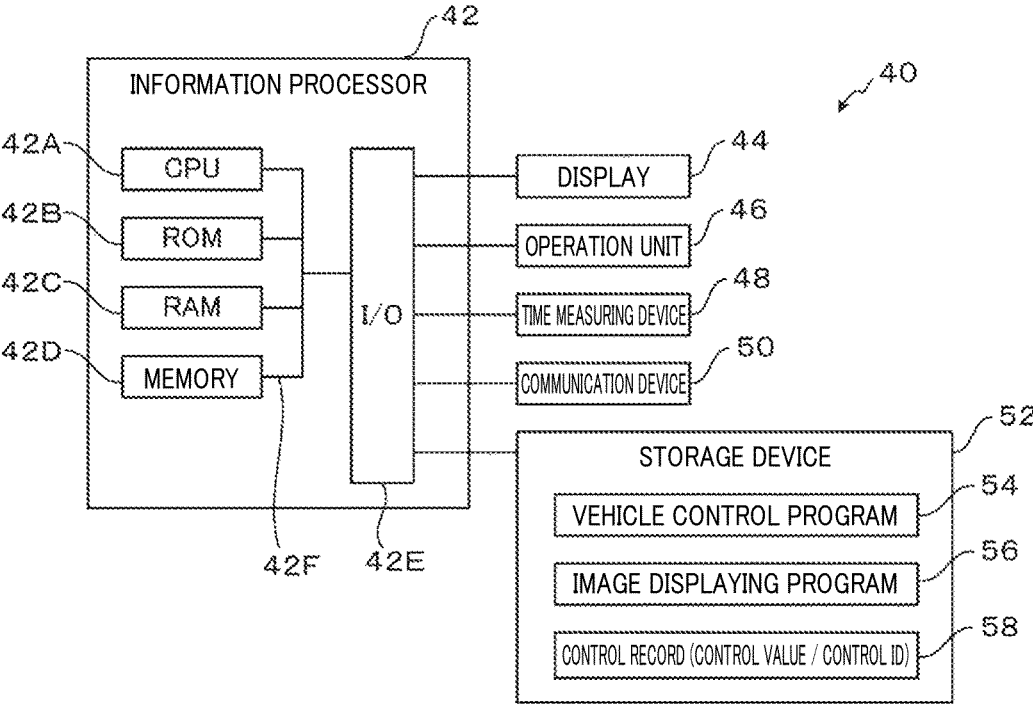
FIG. 5 is a block diagram which illustrates an example of an electrical structure of a remote assistance device.

An example of an electrical structure of the remote assistance device 40 will be described below. The remote assistance device 40, as illustrated in FIG. 5, also includes the time measuring device 48, the communication device 50, and the storage device 52 in addition to the information processing unit 42, the display 44, and the operation unit 46 which are described above. The information processing unit 42 plays a role as a remote assistance server and includes the CPU 42A, the ROM 42B, the RAM 42C, the non-volatile memory 42D, and the input and output (I/O) device 42E which are connected together using the bus 42F. The display 44, the operation unit 46, the time measuring device 48, the communication device 50, and the storage device 52 are connected to the I/O device 42E.

Each of the information processing unit 42 and the communication device 50 is identical in structure with the in-vehicle device 20, and explanation thereof in detail will be omitted here. The display 44 serves as an output device for visually presenting information. The display 44 may be made of a multi-display device including a plurality of display units. The operation unit 46 serves as an operation input unit which receives operation inputs from the remote driver D and includes, for example, a steering wheel, an acceleration pedal, and a brake pedal.

The time measuring device 48 serves as a clock to measure time and is used to detect and record a time when the control information is produced. For instance, the time measuring device 48 may be implemented by a GPS device which detects or obtains a standard time in order to achieve synchronization in time with the vehicle 10. The storage device 52 is made of an external storage memory other than an HDD. The storage device 52 retains therein the vehicle control program 54, the image display program 56, and the control track record 58. The vehicle control program 54 and the image display program 56 are executed to perform a vehicle control task and an image displaying task, respectively. The control track record 58 has pieces of the control information recorded in time series.

System Functional Structure

Figure 6:
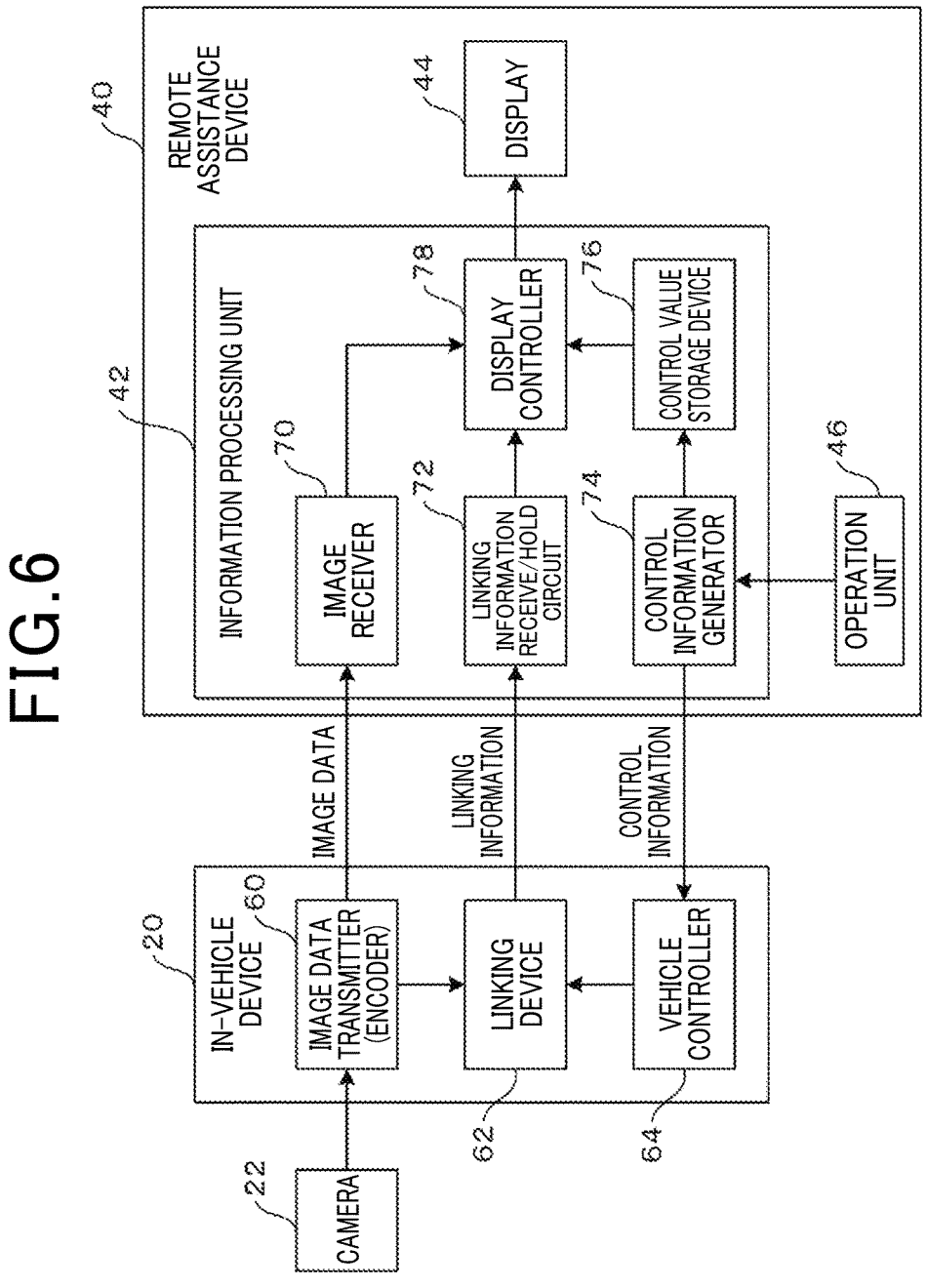
FIG. 6 is a functional block diagram which illustrates parts of a remote assistance system in this disclosure.

An example of a functional structure of the remote assistance system will be described below with reference to FIG. 6. The in-vehicle device 20 includes the image data transmitter 60, the linking device 62, and the vehicle controller 64. The remote assistance device 40 includes the information processing unit 42, the display 44, and the operation unit 46. The information processing unit 42 includes functional units: the image receiver 70, the linking information receive/hold circuit 72, the linking information receive/hold circuit 72, the control information generator 74, the control value storage device 76, and the display controller 78. The functional units are logically realized by execution of programs, which will be described later in detail.

When receiving an operation input from the remote driver D through the operation unit 46 at the remote side (i.e., the remote assistance device 40), the control information generator 74 works to produce a control value cyclically as a function of the operation input. The control information generator 74 also produces control IDs each for identification of one of the control values and outputs the control values and the control IDs to the vehicle 10. The control information generator 74 also works to determine a time (which will also be referred to as a control value generation time) when each of the control values is generated, links each of the control values to a corresponding one of the control IDs and a corresponding one of the control value generation times, and stores them in the control value storage device 76 in the form of time-series sets. Such linking facilitates selection of a required one of the control values using the control IDs and the control value generation times.

In the vehicle 10, the image data transmitter 60 receives data on a captured image captured from the camera 22, encodes the image data, and outputs it in the form of a plurality of discrete packets to the remote side. Simultaneously, the image data transmitter 60 obtains timestamps given to the packets of the image data and outputs them to the linking device 62. Each of the timestamps is a sequence of characters representing the time when the image was captured and used to identify the image data.

The vehicle controller 64 receives the control information from the remote side to control operations of the devices or mechanisms installed in the vehicle 10 according to the control values carried by the control information. The vehicle controller 64 outputs the control ID contained in the control information to the linking device 62. The linking device 62 produces linking information for linking the timestamp and the control ID with each other and outputs it to the remote side. The linking information is used to link the timestamp representing when the image was captured with the control ID contained in the control information received by the vehicle 10 when the image was captured. The linking information is transmitted to the remote side in a data stream independent from that of the image data without affecting the system which transmits the image data.

At the remote side, the image receiver 70 receives the packets of the image data transmitted from the vehicle 10 and decodes them to produce image data. The image receiver 70 also obtains the timestamps from the packets. The image receiver 70 outputs the image data and the timestamps to the display controller 78. The linking information receive/hold circuit 72 receives the linking information from the vehicle 10 and holds or retains it therein. The linking information is usually smaller in size than the image data and hardly subjected to any time lag in transmission from the vehicle 10. The linking information receive/hold circuit 72, therefore, holds the linking information until corresponding image data arrives at the remote side. For instance, the lining information receive/hold circuit 72 may store the control IDs linking with the timestamps to identify a required one of the control IDs using the timestamp.

At the remote side, when the image data is inputted into the remote assistance device 40, the display controller 78 obtains the image data and the timestamps added to the image data and identifies one of pieces of the linking information which contains the same timestamps (which will also be referred to as first linking information). The display controller 78 identifies the control ID linked to the timestamps of the first linking information, obtains a control value linking to the identified control ID as a past control value when the image was captured in the vehicle 10, and also obtains a present control value. The display controller 78 then produces an auxiliary image using the past control value and the present control value, generates an image on which the auxiliary image is overlaid, and outputs the image to the display 44.

Vehicle Control Program

Figure 7:
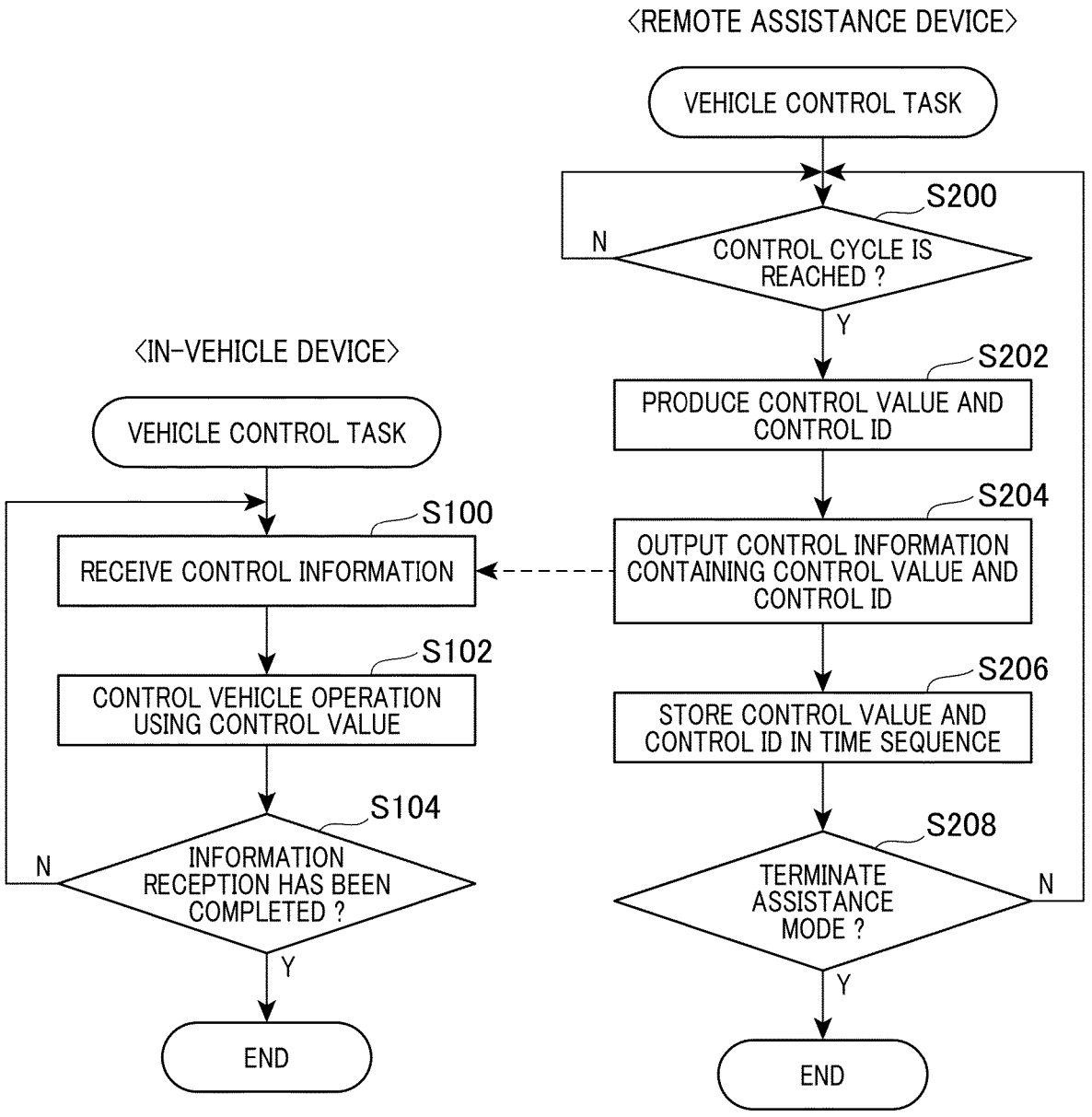
FIG. 7 is a view which illustrates flowcharts of sequences of steps of vehicle control tasks performed by an in-vehicle device and a remote assistance device in this disclosure.

FIG. 7 is a flowchart of programs or sequences of steps performed in the vehicle 10 and the remote assistance device 40. Specifically, the vehicle control program 32 is executed by the CPU 20A installed in the in-vehicle device 20. The vehicle control program 54 is executed by the CPU 42A of the information processing unit 42 installed in the remote assistance device 40. The execution of these programs is initiated in response to an assistance request outputted from the in-vehicle device 20 to the remote assistance device 40.

After entering the vehicle control program 54 in the remote assistance device 40, the routine proceeds to step S200 wherein the CPU 42A determines whether the control cycle is reached. If a YES answer is obtained, then the routine proceeds to step S202 wherein the CPU 42A receives an operation input made by the remote driver D and then produces a corresponding control value and a corresponding control ID. The routine proceeds to step S204 wherein the CPU 42A controls an operation of the communication device 50 to transmit the control information containing a combination of the control value and the control ID derived in step S202 to the vehicle 10.

The routine proceeds to step S206 wherein the CPU 42A links the control value and the control ID to each other and stores them in the storage device 52 in time sequence. The routine proceeds to step S208 wherein the CPU 42A determines whether an assistance mode is terminated, in other words, whether the remote driver D has instructed to terminate the task of remotely maneuvering the vehicle 10. If a NO answer is obtained meaning that the remote driving task is required to continue, then the routine returns back to step S200 and waits for a subsequent control cycle. Alternatively, if a YES answer is obtained, then the routine terminates.

In the vehicle 10, after entering the vehicle control program 32, the routine proceeds to step S100 wherein when detecting the reception of the control information in the communication device 28 which is transmitted from the remote side, the CPU 20A installed in the in-vehicle device 20 obtains the control value from the control information. The routine proceeds to step S102 wherein the CPU 20A controls an operation of the vehicle 10 using the control value derived in step S100. The routine proceeds to step S104 wherein the CPU 20A determines whether the reception of the control information transmitted from the remote side (i.e., the remote assistance device 40) has been completed. When receiving the instruction to terminate the remote driving task from the remote side, or continuing not to receive a subsequent piece of the control information for a predetermined period of time, the CPU 20A determines that the reception of the latest piece of the control information has been terminated. The routine then terminates. Alternatively, if a NO answer is obtained in step S104, the routine returns back to step S100.

Figure 8:
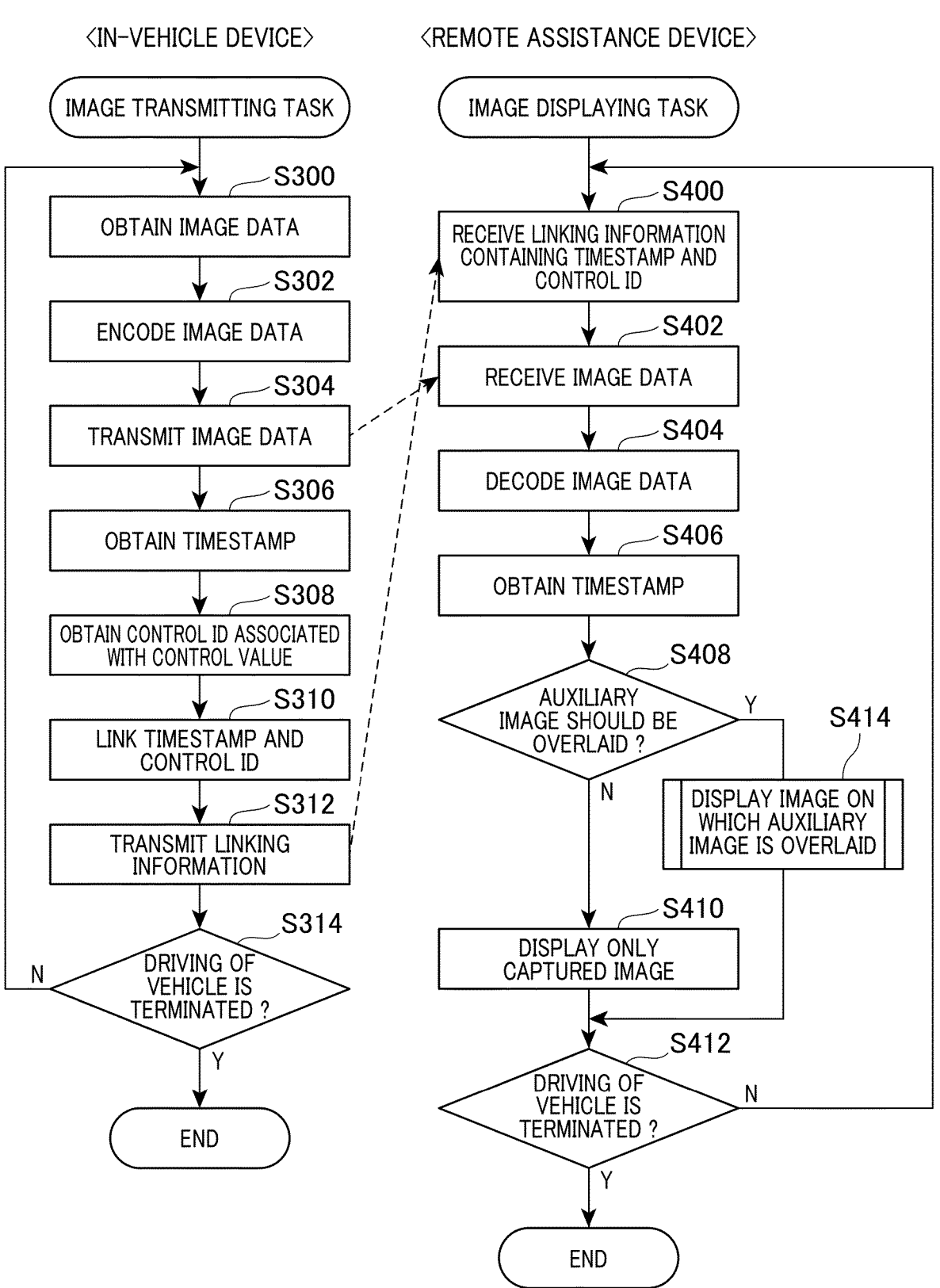
FIG. 8 is a view which illustrates flowcharts of sequences of steps of image displaying tasks performed by image transmitter in an in-vehicle device and a remote assistance device.

FIG. 8 shows a sequence of steps of the image transmission program 34 executed in the vehicle 10 and a sequence of steps of the image display program 56 executed at the remote side (i.e., the remote assistance device 40). The image transmission program 34 is executed by the CPU 20A installed in the in-vehicle device 20. The image display program 56 is executed by the CPU 42A of the information processing unit 42 installed in the remote assistance device 40. The execution of the image transmission program 34 and the image display program 56 is initiated upon start of driving the vehicle 10. During traveling, the vehicle 10 continues to transmit the image data and the linking information to the remote side regardless of execution of the driving assistance to the vehicle 10. The display 44 at the remote side, therefore, continues to display image transmitted form the vehicle 10.

In the vehicle 10, after entering the image transmission program 34, the routine proceeds to step S300 wherein the CPU 20A obtains image data from the camera 22. The routine proceeds to step S302 wherein the image data is encoded to produce packets. The routine proceeds to step S304 wherein the CPU 20A controls an operation of the communication device 28 to transmit the packets of the image data to the remote side.

The routine proceeds to step S306 wherein the CPU 20A obtains the timestamps added to the packets of the image data. The routine proceeds to step S308 wherein the CPU 20A obtains the control ID corresponding to the control value contained in the control information provided when the image was captured by the camera 22. The routine proceeds to step S310 wherein the CPU 20A links the timestamp and the control ID to each other to produce the linking information. The routine proceeds to step S312 wherein the CPU 20A controls the operation of the communication device 28 to transmit the linking information, as derived in step S310, to the remote side.

The routine proceeds to step S314 wherein the CPU 20A determines whether the driving of the vehicle 10 has been terminated. If a YES answer is obtained, then the routine terminates. Alternatively, if a NO answer is obtained meaning that the vehicle 10 continues to be driven, then the routine returns back to step S300.

At the remote side, in step S400, when detecting the fact that the linking information, as transmitted from the vehicle 10, has been received by the communication device 50, the CPU 42A holds or stores the received linking information in the memory 42D. The routine proceeds to step S402 wherein the CPU 42A detects the fact that the packets of the image data, as transmitted from the vehicle 10, has been received in the communication device 50. The routine proceeds to step S404 wherein the CPU 42A decodes the received packets to produce image data. The routine proceeds to step S406 wherein the CPU 42A obtains the timestamps added to the packets.

The order in which the operations in steps S400 to S406 are performed may be altered as needed. The linking information is, as described above, smaller in data size than the image data and therefor hardly subjected to any time lag in transmission from the vehicle 10. This causes the linking information to be received by the remote assistance device 40 before the corresponding image data arrives at the remote assistance device 40. In some cases, a plurality of pieces of the linking information have been received by the remote assistance device 40 earlier than the image data. The remote assistance device 40, therefore, selects a corresponding one of the pieces of the linking information to process it in the given way.

The routine proceeds to step S408 wherein the CPU 42A determines whether the auxiliary image should be overlaid on an image to be represented to the remote driver D using a predetermined criterion. In this embodiment, when the remote driver D is performing the remote driving of the vehicle 10, the auxiliary image is overlaid on an image to be displayed to the remote driver D. Alternatively, when the remote driver D is not performing the remote driving, the auxiliary image is not overlaid on the image. If a NO answer is obtained meaning that the auxiliary image should not be overlaid, then the routine proceeds to step S410 wherein the CPU 42A controls the operation of the display 44 to show only the original image captured by the camera 22.

Alternatively, if a YES answer is obtained in step S408, then the routine proceeds to step S414 wherein the CPU 42A performs an overlaid image displaying operation to overlay the auxiliary image on the original image. The routine proceeds to step S412 wherein the CPU 42A determines whether the driving of the vehicle 10 has been terminated. If a YES answer is obtained, then the routine terminates. Alternatively, if a NO answer is obtained meaning that the vehicle 10 continues to be driven, then the routine returns back to step S400.

The overlaid image displaying operation will be described below in detail with reference to FIG. 9. First, in step S500, the CPU 42A obtains the control ID corresponding to the timestamps added to the image data received by the remote assistance device 40. The routine proceeds to step S502 wherein the CPU 42A obtains the control value linking to the control ID derived in step S500 and determines it as a past control value provided or used in the vehicle 10 when the image was captured in the vehicle 10. The routine proceeds to step S504 wherein the CPU 42A obtains a present control value. The routine proceeds to step S506 wherein the CPU 42A produces the auxiliary image using the past and present control values. The routine proceeds to step S508 wherein the CPU 42A overlays the auxiliary image on the original image to produce a composite image to be represent to the remote driver D. The CPU 42A controls the operation of the display 44 to visually represent the composite image.

Auxiliary Image

Possible variations of the auxiliary image will be described below. In the first embodiment, the controlled steering variable indicator 80, the controlled acceleration/deceleration variable indicator 90, the vehicle speed indicator 100 representing the speed of the vehicle 10 when the image was captured in the vehicle 10, and the displaying lag time indicator 110 are visually overlaid on the captured image (i.e., the original image) as the auxiliary image.

Variations of the controlled steering variable indicator 80 will be described below with reference to FIGS. 10A to 11F. Variations of the controlled acceleration/deceleration variable indicator 90 will be described below with reference to FIGS. 12A to 12C.

Display of Controlled Steering Variable

FIG. 10A illustrates an example wherein the controlled steering variable indicator 80 includes the icon 80A and the icon 80D displayed adjacent each other laterally. The icon 80A represents a controlled steering variable (which will also be referred to as a past controlled steering variable) required when the image was captured in the vehicle 10. The icon 80*d* represents a controlled steering variable required currently (which will also be referred to as a present controlled steering variable). The arrow 88 which represents a time sequence is displayed between the right icon 80A and the left icon 80D. The icons 80A and 80D will also be referred to below as past parameter-indicating icon and a present parameter-indicating icon.

The icon 80A includes the mark 82A with a steering wheel motif and the indicator 86A which represents a direction in which the steering wheel is turned and an angle by which the steering wheel is turned. The mark 82A has overlaid thereon the reference mark 84A and represents a steered angle in the form of an angle by which the steering wheel is turned. When the reference mark 84A is appearing at the center position of the icon 80A in the horizontal direction, in other words, at the uppermost position of the icon 80A, the steered angle represents 0°. The indicator 86A includes at least one arrow (a plurality of arrows in the illustrated example). The arrow direction of the indicator 86A represents a direction in which the vehicle 10 is steered, in other words, a right turn or a left turn of the vehicle 10. The number of arrows of the indicator 86A represents a measure of the angle by which the steering wheel is turned. Similarly, the icon 80D includes the mark 82D representing the present steered angle, the reference mark 84D, and the indicator 86D.

The use of the above type of icons enables the remote driver D to visually perceive a steered direction of the vehicle 10 and a measure of steered angle of the vehicle 10. The use of two icons: the past parameter-indicating icon 80A and the present parameter-indicating icon 80D enables the remote driver D to visually perceive gaps between the past and present steered directions and between the past and present steered angles. For instance, the example illustrated in FIG. 10A enables the remote driver D to understand that the vehicle 10 is being changed from the right-steering control mode to the left-steering control mode.

The past parameter-indicating icon 80A and the present parameter-indicating cion 80D may be, as illustrated in FIG. 10B, designed to be different in color from each other. For instance, the mark 82A of the past parameter-indicating cion 80A is display in dark color, such as black, while the mark 82D of the present parameter-indicating icon 80D is displayed in light color, such as gray. The use of dark color causes the past parameter-indicating icon 80A to be visually more intense than the present parameter-indicating icon 80D. Instead of differentiating the colors of the icons 80A and 80D from each other, colors of backgrounds of the icons 80A and 80D may alternatively be differentiated from each other. Like in the example of FIG. 10A, the arrow 88 may be displayed between the icons 80A and 80D.

Figure 10C:
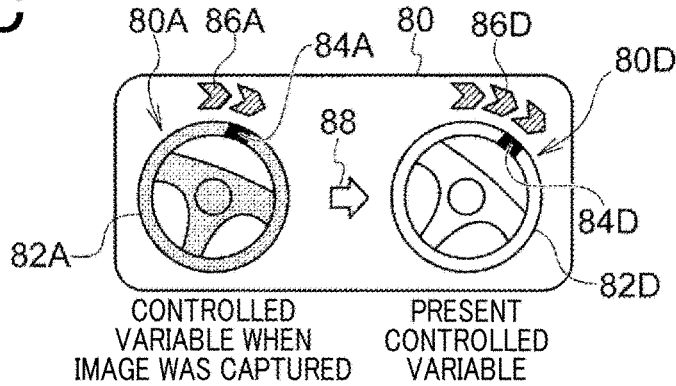
FIG. 10C is a view which demonstrates the third example of icons representing controlled steering variables included in an auxiliary image.
Figure 10D:
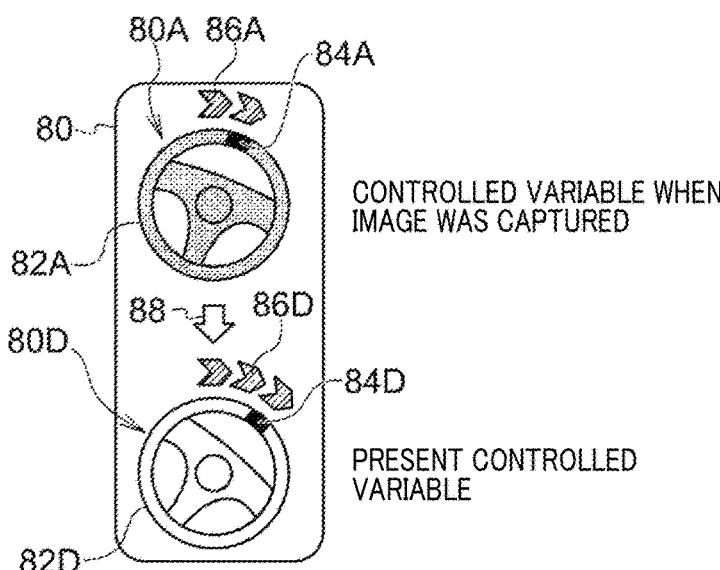
FIG. 10D is a view which demonstrates the fourth example of icons representing controlled steering variables included in an auxiliary image.

The positional relation between the icons 80A and 80D may be changed in a way illustrated in FIG. 10C or 10D. In the example illustrated in FIG. 10C, the past parameter-indicating icon 80A is displayed on the left side of the present parameter-indicating icon 80D. The arrow 88 is also oriented in a rightward direction opposite to that in FIG. 10A or 10B. In the example illustrated in FIG. 10D, the past parameter-indicating icon 80A is displayed above the present parameter-indicating icon 80D. The arrow 88 is oriented downward between the icons 80A and 80D.

The indicator 86A may be modified in shape, color, or orientation in various ways. The following discussion will refer only to possible modifications of the indicator 86A of the past parameter-indicating cion 80A for the sake of simplicity, but the same applies to the indicator 86D of the present parameter-indicating icon 80D.

Figure 11A:
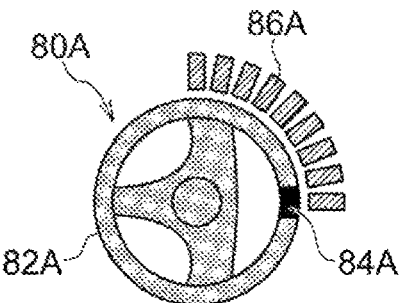
FIG. 11A is a view which demonstrates the first example of an icon representing a controlled steering variable included in an auxiliary image.
Figure 11B:
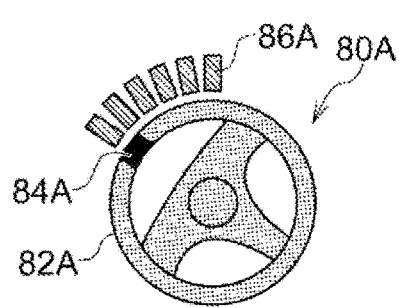
FIG. 11B is a view which demonstrates the second example of an icon representing a controlled steering variable included in an auxiliary image.
Figure 11C:
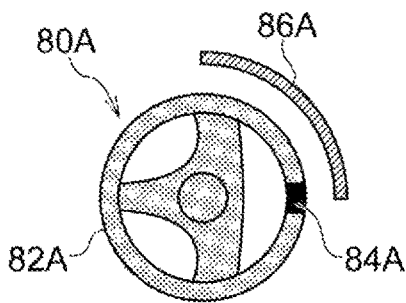
FIG. 11C is a view which demonstrates the third example of an icon representing a controlled steering variable included in an auxiliary image.
Figure 11D:
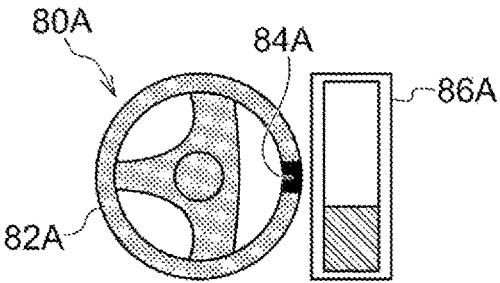
FIG. 11D is a view which demonstrates the fourth example of an icon representing a controlled steering variable included in an auxiliary image.
Figure 11E:
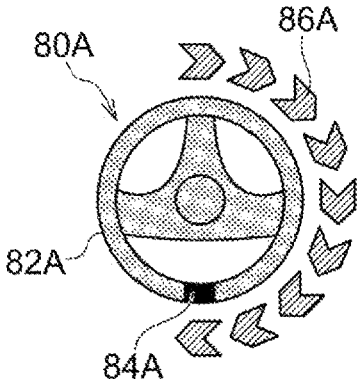
FIG. 11E is a view which demonstrates the fifth example of an icon representing a controlled steering variable included in an auxiliary image.
Figure 11F:
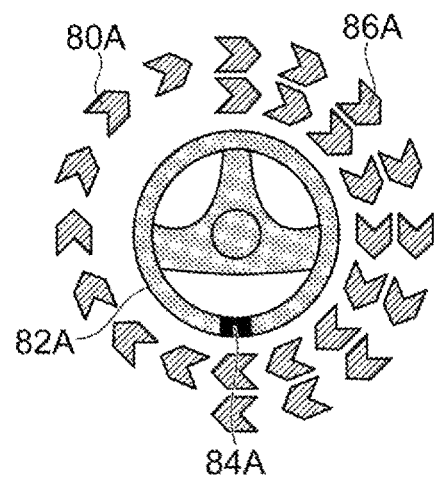
FIG. 11F is a view which demonstrates the sixth example of an icon representing a controlled steering variable included in an auxiliary image.

The indicator 86A may alternatively, as illustrated in FIG. 11A or 11B, consist of one of a plurality of bar-shaped marks arrayed radially around the center of the steering wheel. The array of the bar-shaped marks may be displayed in green to represent a right turn of the vehicle 10, that is, when the steering wheel is turning right, while it may be displayed in yellow to represent a left turn of the vehicle 10, that is, when the steering wheel is turning left. The number of the bar-shaped barks represents a measure of the angle by which the steering wheel is turned, that is, the vehicle 10 is steered. The indicator 86A may alternatively, as illustrated in FIG. 11D, consist of an arc-shaped gauge mark or a bar-shaped gauge mark illustrated in FIG. 11D. The indicator 86A may alternatively, as illustrated in FIG. 11E, consist of an array of arrow symbols or a spiral array of arrow symbols illustrated in FIG. 11F. The use of the spiral array of arrow symbols enables a measure of a turn angle of the steering wheel to be visually perceived when it exceeds over 360°.

Display of Controlled Acceleration/Deceleration Variable

Figure 12A:
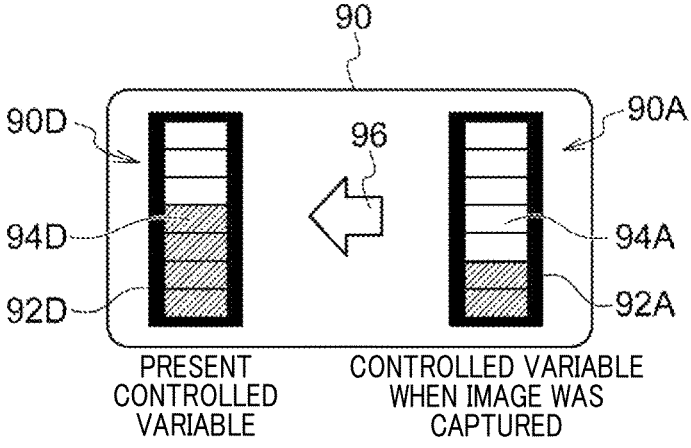
FIG. 12A is a view which demonstrates the first example of icons representing controlled acceleration/deceleration variables included in an auxiliary image.

FIG. 12A illustrates an example of the controlled acceleration/deceleration variable indicator 90 which includes the icon 90A and the icon 90D which are arranged laterally adjacent to each other. The icon 90A represents a controlled acceleration/deceleration variable provided or used in the vehicle 10 when the image was captured in the vehicle 10 (which will also be referred to as a past parameter-indicating icon). The icon 90D represents a controlled acceleration/deceleration variable provided currently (which will also be referred to as a present parameter-indicating icon). The arrow 96 which represents a time sequence is displayed between the icons 90A and 90D.

The past parameter-indicating icon 90A includes the background 92A and the indicator 94A representing a measure of depression (i.e., a position) of an accelerator pedal or a brake pedal. The indicator 94A consists of a plurality of bar-shaped marks stacked vertically on one another. When all the bar-shaped marks turn bright, it represents an upper limit of the position of the accelerator pedal or the brake pedal. A ratio of bright or colored one(s) to the rest of the bar-shaped marks represents a position of the accelerator pedal or the brake pedal in a digital form which corresponds to the controlled acceleration/deceleration variable. For instance, when the first to second bar-shaped symbols from the bottom are visually bright, it represents the accelerator pedal or the brake pedal being at the second position. When the first to third bar-shaped symbols from the bottom are visually bright, it represents the accelerator pedal or the brake pedal being at the third position. The use of different colors in showing the bar-shaped marks discriminates between the accelerator pedal and the brake pedal. For instance, when it is required to show the accelerator pedal, the bar-shaped marks are displayed in green, while when it is required to show the brake pedal, the bar-shaped marks are displayed in red. Similarly, the present parameter-indicating icon 90D includes the background 92D and the indicator 94D representing a position of the accelerator pedal or the brake pedal in the same way as described above.

The use of the above icons enables the remote driver D to visually perceive the identification or position of the accelerator pedal or the brake pedal. The use of two discrete icons: the past parameter-indicating icon 90A and the present parameter-indicating icon 90D enables the driver D to visually perceive a gap between the past and present positions of the accelerator pedal or the brake pedal. For instance, the example in FIG. 12A enables the remote driver D understands that the accelerator pedal is now being shifted from the second to fourth position.

Figure 12B:
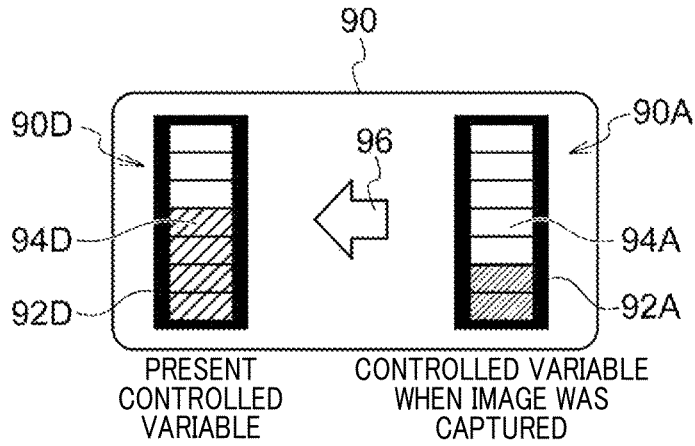
FIG. 12B is a view which demonstrates the second example of icons representing controlled acceleration/deceleration variables included in an auxiliary image.
Figure 12C:
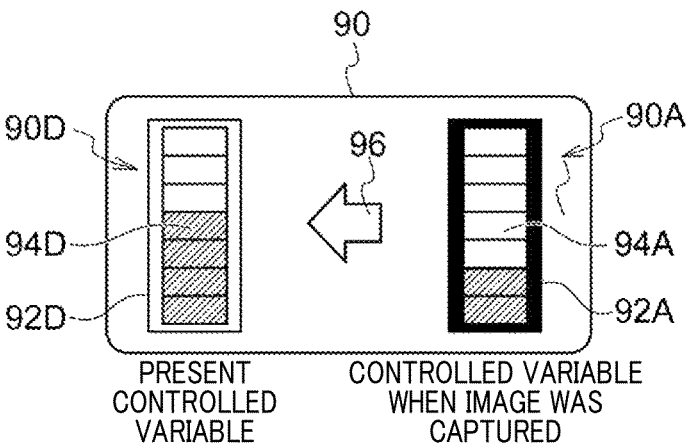
FIG. 12C is a view which demonstrates the third example of icons representing controlled acceleration/deceleration variables included in an auxiliary image.

The past parameter-indicating icon 90A and the present parameter-indicating icon 90D may be, as can be seen in FIGS. 12B and 12C, displayed in different colors. In the example in FIG. 12B, the indicator 94A of the past parameter-indicating icon 90A consists of an array of dark green bar-shaped symbols, while the indicator 94D of the present parameter-indicating icon 90D consists of an array of soft green bar-shaped symbols. Alternatively, the background 92A of the past parameter-indicating icon 90A may be, as illustrated in FIG. 12C, displayed dark, while the background 92D of the present parameter-indicating icon 90D may be displayed in a soft color, such as grey. The use of a dark color for the past parameter-indicating icon 90A is enabled to be more highlighted than the present parameter-indicating icon 90D.

Like the controlled steering variable indicator 80, a positional relation between the past parameter-indicating icon 90A and the present parameter-indicating icon 90D may be changed. For instance, the past parameter-indicating icon 90A and the present parameter-indicating icon 90D may be reversed right and left or up and down.

As apparent from the above discussion, the first embodiment provides, to the remote driver D, a displayed image on which an icon(s) representing a controlled variable provided when such an image was captured is overlaid. This enables the remote driver D to visually perceive a value of a controlled variable in an intuitive way which is causing behavior of the vehicle 10 viewed on the image now displayed. It is possible for the remote driver D to analyze a displayed controlled variable (i.e., a past controlled variable already transmitted to the vehicle 10) to determine, for example, that there is no need to turn the steering wheel at the present time, which eliminates a risk that the vehicle 10 may be subjected to an erroneous operation. The overlay of the past parameter-indicating icon representing a past controlled variable already transmitted to the vehicle 10 and the present parameter-indicating icon representing a latest provided controlled variable (i.e., a present controlled variable) on a displayed image enables the remote driver D to immediately perceive a gap or difference between the past controlled variable and the present controlled variable.

Second Embodiment

The second embodiment will be described below which is different only in structure of the auxiliary image from the first embodiment. Other arrangements are identical, and explanation thereof in detail will be omitted here.

Figure 13:
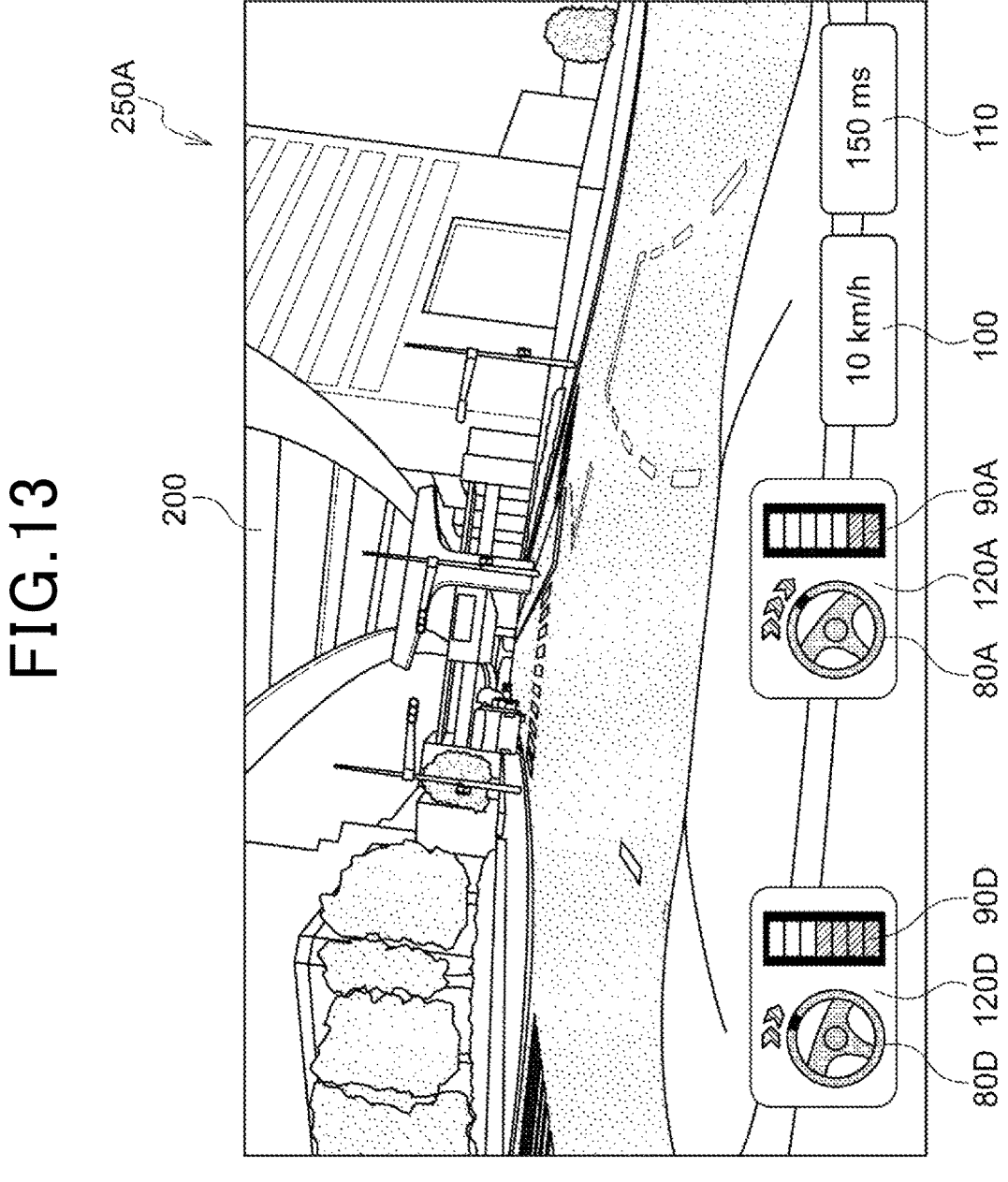
FIG. 13 is a view which demonstrates an example of an image on which an auxiliary image is overlaid which includes a set of icons representing a past piece of control information about a measure of a controlled steering variable used when an image was captured and a present piece of control information about a measure of a controlled steering variable produced most recently and a set of icons representing a past piece of control information about a measure of a controlled acceleration/deceleration variable used when an image was captured and a present piece of control information about a measure of a controlled acceleration/deceleration variable produced most recently.

The auxiliary image used in the first embodiment includes the controlled steering variable indicator 80, the controlled acceleration/deceleration variable indicator 90, the vehicle speed indicator 100 representing the speed of the vehicle 10 when an image was captured in the vehicle 10, and the displaying lag time indicator 110, while the auxiliary image used in the second embodiment, as shown in FIG. 13, includes the past controlled variable indicator 120A, the present controlled variable indicator 120D, the vehicle speed indicator 100, and the displaying lag time indicator 110.

The controlled variable indicator 120A includes a combination of the past parameter-indicating icon 80A and the past parameter-indicating icon 90A which are laterally arranged adjacent to each other. The past parameter-indicating icon 80A, as described above, represents a controlled steering variable provided or used in the vehicle 10 when the image was captured in the vehicle 10. The past parameter-indicating icon 90A, as described above, represents a controlled acceleration/deceleration variable provided when the image was captured in the vehicle 10. Similarly, the present controlled variable indicator 120D includes a combination of the present parameter-indicating icon 80D and the present parameter-indicating icon 90D. The present parameter-indicating icon 80D, as described above, represents a controlled steering variable provided currently. The present parameter-indicating variable 90D, as described above, represents a controlled acceleration/deceleration variable provided currently. The above icon layouts of the controlled variable indicator 120A and the present controlled variable indicator 120D enable the remote driver D to immediately perceive different types of controlled variables on the displayed image 250A.

Figure 14A:
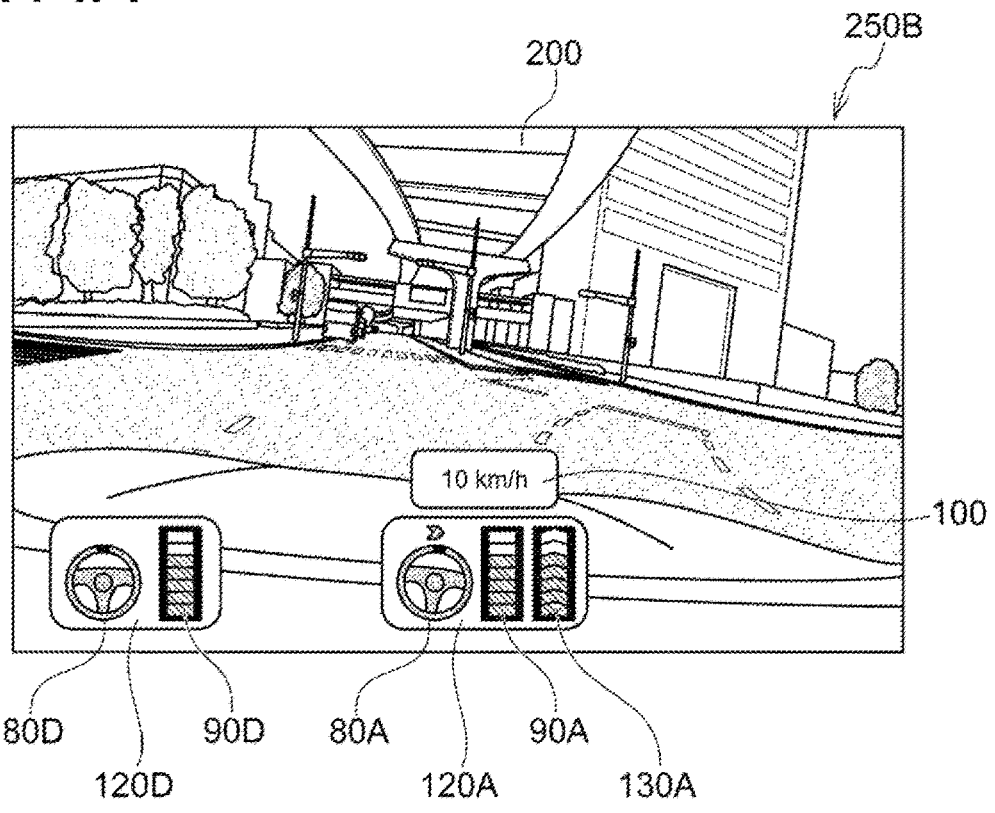
FIG. 14A is a view which illustrates the icons, as illustrated I FIG. 13, which represent controlled acceleration variables.

The auxiliary image may, as illustrated in FIG. 14A, include the acceleration indicator 130A representing an actual value of acceleration of the vehicle 10 when the image was captured. The acceleration indicator 130A is located on the displayed image 250B close to the past parameter-indicating icon 90A representing a controlled acceleration/deceleration variable. Usually, a controlled variable calculated as a function of a pedal effort produced by the remote driver D may differ from an actual value of acceleration of the vehicle 10 depending upon a gear change in the vehicle 10 or a change in weight of the vehicle 10 arising from a change in number of occupants in the vehicle 10. The indication of the actual value of the acceleration of the vehicle 10 in addition to the past parameter-indicating icon 90A representing the controlled acceleration/deceleration variable provided when the image was captured in the vehicle 10 enables the remote driver D to visually detect an actual change in acceleration of the vehicle 10 which is usually difficult to perceive on the displayed image 250B, thereby minimizing a risk of an undesirable operation made by the remote driver D on the acceleration pedal.

Figure 14B:
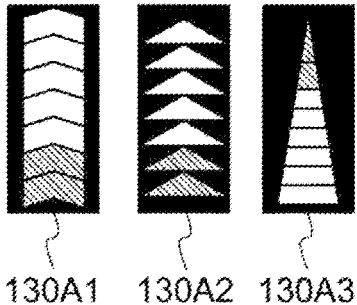
FIG. 14B is a view which illustrates the first example of icons representing acceleration of a target vehicle.
Figure 14C:
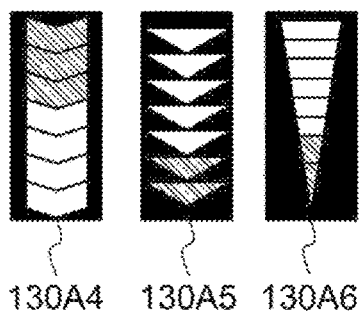
FIG. 14C is a view which illustrates the second example of icons representing acceleration of a target vehicle.

The acceleration indicator 130A may as illustrated in FIG. 14B or 14C, consist of at least one arrow-symbol. In the illustrated example, the accelerator indicator 130A includes a stack of a plurality of arrow-symbols. The orientation or color of the arrow-symbols represents acceleration or deceleration of the vehicle 10. When all the arrow-symbols turn bright, it represents an upper limit of the acceleration of the vehicle 10. A ratio of bright or colored one(s) to the rest of the arrow-symbols represents a measure of the acceleration of the vehicle 10. For instance, the acceleration indicator 130A may be designed in the form of the indicator 130A1, 130A2, or 130A3 which includes a stack of arrows facing upward and represents the vehicle 10 being accelerating. The acceleration indicator 130A may be designed in the form of the indicator 130A4, 130A5, or 130A6 which includes a stack of arrows facing downward and represents the vehicle 10 being decelerating. Each of the acceleration indicators 130A1 to 130A3 may be displayed in cold color, such as blue or green. Each of the deceleration indicators 130A4 to 130A6 may be displayed in warm color, such as red or pink.

As apparent from the above discussion, the second embodiment offers substantially the same beneficial advantages as in the first embodiment. The display of two-icon layout (i.e., layout of the controlled steering variable-indicating icon and the controlled acceleration/deceleration variable-indicating icon) enables the remote driver D to immediately perceive a plurality of controlled variables.

Third Embodiment

The third embodiment will be described below which is different only in structure of the auxiliary image from the first embodiment. Other arrangements are identical, and explanation thereof in detail will be omitted here.

Figure 15:
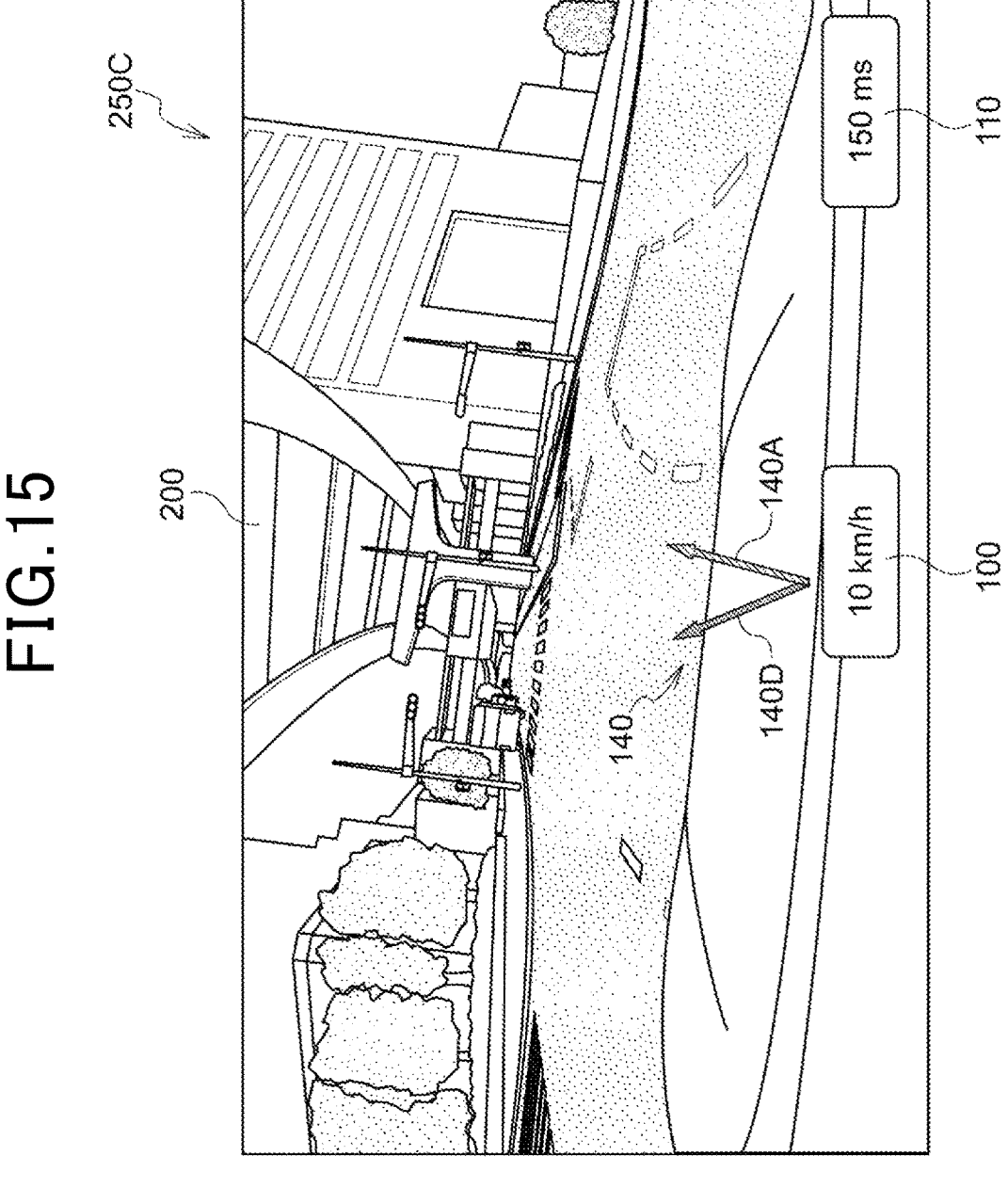
FIG. 15 is a view which demonstrates an example of an image on which an auxiliary image is overlaid which includes an arrow-shaped icon representing a past piece of control information used when an image was captured and a present piece of control information produced most recently.

The auxiliary image used in the third embodiment, as illustrated in FIG. 15, includes the controlled variable indicator 140, the vehicle speed indicator 100 representing the speed of the vehicle 10 when an illustrated image was captured, and the displaying lag time indicator 110. The controlled variable indicator 140 includes the arrow icon 140A and the arrow icon 140D. The arrow icon 140A represents a controlled variable provided when the image 250A was captured in the vehicle 10 (which will also be referred to below as past parameter-indicating icon). The arrow icon 140D represents a controlled variable provided currently (which will also be referred to below as present parameter-indicating icon).

In the first and second embodiments, the controlled steering variable and the controlled acceleration/deceleration variable are expressed using icons, while the arrow icons 140A and 140D in this embodiment are oriented to have heads presenting directions in which the vehicle 10 was heading and will be heading, respectively. The base of each of the arrow icons 140A and 140D represents a start point of the control task which may be located at an optional position on the displayed image 250C. The use of the arrow icons 140A and 140D enables the remote driver D to immediately perceive the past and present controlled variables.

Figure 16:
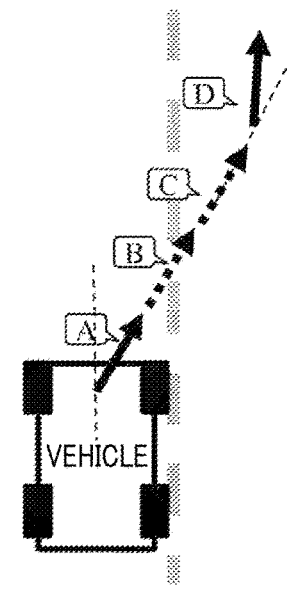
FIG. 16 is a view which demonstrates an image of a target vehicle captured from above which schematically represents a locus of movement of the target vehicle in a lag time between when the image was captured and the present time at a remote side.

FIG. 16 demonstrates an image of the vehicle 10 captured from above which schematically represents a locus of movement of the vehicle 10 in a lag time between when the image was captured in the vehicle 10 and the present time at the remote side. The past parameter-indicating arrow icon 140A, as described above, represents the direction in which the vehicle 10 was heading when the image was captured in the vehicle 10 and which is indicated by a direction, as denoted by a solid line, in which road wheels of the vehicle 10 were oriented when the image was captured, that is, at a time when the control task A was being executed and may be calculated as a function of a turn angle of the steering wheel when the image was captured. The direction in which the vehicle 10 is expected to head which is indicated by the present parameter-indicating icon 140D may be defined as a direction in which the road wheels are expected to face relative to a direction, as indicated by a broken line, in which the vehicle 10 is viewed to head straight at the present time (i.e., a time when the control task D is produced), in other words, a direction in which the camera 22 is facing. Such a direction may, therefore, be calculated as a function of a turn angle of the steering wheel at the present time.

Figure 17A:
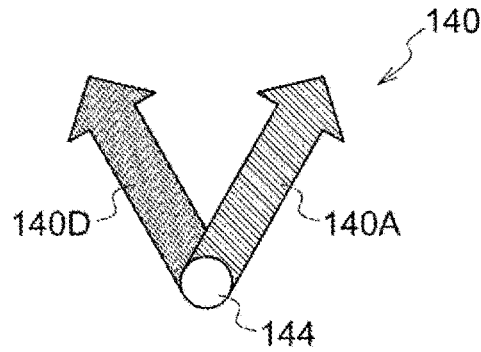
FIG. 17A is a view which illustrates the first example of arrow-shaped icons.

The past parameter-indicating icon 140A and the present parameter-indicating icon 140D may be, as illustrated in FIG. 17A, displayed in different colors for facilitating discrimination therebetween. For instance, the past parameter-indicating icon 140A may be displayed in yellow, while the present parameter-indicating icon 140D may be displayed in blue. Each of the icons 140A and 140D may have the circular mark 144 on the base of the arrow for the ease of visibility of a start point of the icons 140A and 140D.

An arrow-shaped icon, like the icon 140A or 140D, is typically suitable for indicating a direction in which a vehicle heads, but may be used to indicate another controlled variable. For instance, the arrow-shaped icon may be displayed to have a length variable to represent the speed of the vehicle. For instance, when the vehicle is moving at a speed of x meters/second (m/s), a point which is x m away from a start point of the control task may be indicated by the head of the arrow-shaped icon. In other words, the arrow-shaped icon may be displayed to have a length extendable from a reference length in proportion to a value of the speed of the vehicle.

Figure 17B:
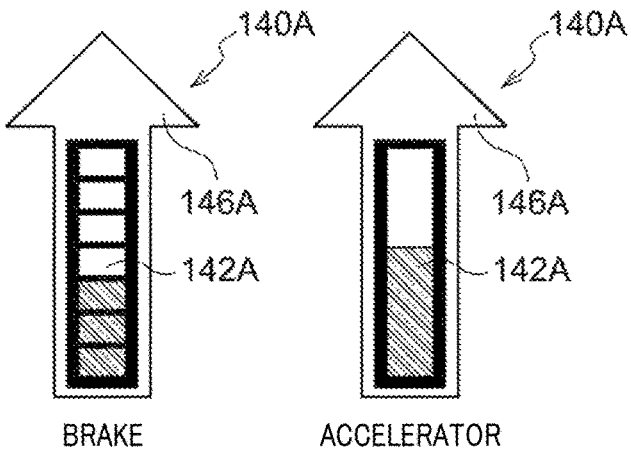
FIG. 17B is a view which illustrates the second example of arrow-shaped icons.

Like in the first or second embodiment, the controlled acceleration/deceleration variable may be indicated by an indicator on a displayed image. For instance, the past parameter-indicating icon 140A may, as illustrated in FIG. 17B, include the background 146A and the indicator 142A which represents a position of a pedal. The past parameter-indicating icon 140A may be displayed in two kinds of colors: one representing an accelerator pedal, and one representing a brake pedal. For instance, in a case of the acceleration pedal, the background 146A and a portion of the indicator 142A may be displayed in green. In a case of the brake pedal, the background 146A and a portion of the indicator 142A may be displayed in red. The same may apply to the present parameter-indicating icon 140D.

As apparent from the above discussion, the third embodiment offers substantially the same beneficial advantages as those in the first embodiment and also has a unique effect that the use of the arrow-shaped icons in which the orientations of the arrows represent directions in which the vehicle was heading or expected to head in future enables the remote driver D to immediately perceive the contents of the controlled variables.

Fourth Embodiment

The fourth embodiment will be described below which is different only in structure of the auxiliary image from the first embodiment. Other arrangements are identical, and explanation thereof in detail will be omitted here.

Figure 18:
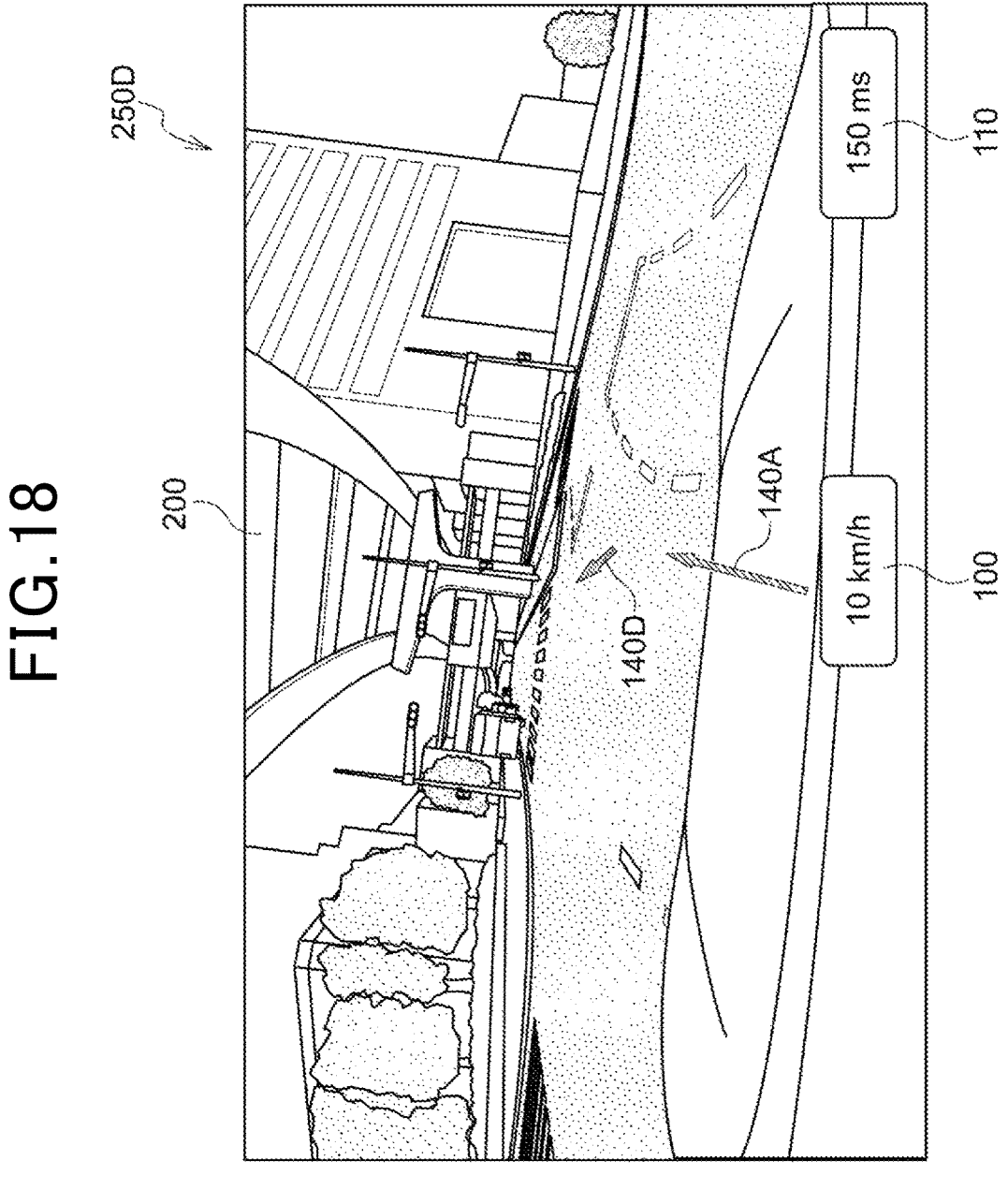
FIG. 18 is a view which demonstrates an example of an image on which an auxiliary image is overlaid which includes arrow-shaped icons according to an embodiment in this disclosure.

The auxiliary image in this embodiment, as illustrated in FIG. 18, includes the past parameter-indicating icon 140A of an arrow shape and the present parameter-indicating icon 140D of an arrow shape. The auxiliary image also includes the vehicle speed indicator 100 representing the speed of the vehicle 10 when the image was captured in the vehicle 10 and the displaying lag time indicator 110.

The past parameter-indicating icon 140A and the present parameter-indicating icon 140D in this embodiment, like in the third embodiment, have arrow-shapes indicating directions in which the vehicle 10 was heading and will be controlled to head, respectively. The past parameter-indicating icon 140A and the present parameter-indicating icon 140D may be displayed in different colors in the same way as in the third embodiment. The mark 144 may be overlaid on the base of each of the arrows. Each of the arrow-shaped icons 140A and 140D may have a length variable to represent the speed of the vehicle 10. The arrow of each of the icons 140A and 140D may have displayed therein an indicator representing a measure of the controlled acceleration/deceleration variable.

The past parameter-indicating icon 140A and the present parameter-indicating icon 140D in the fourth embodiment are displayed to spatially indicate the heading directions of the vehicle 10 and have the bases each of which represents a start point of the control task and is located at a position of the vehicle 10 viewed on the displayed image 250D when the control task was or is expected to be initiated. This enables the remote driver D to visually perceive the present position of the vehicle 10 with a sense of reality.

Figure 19:
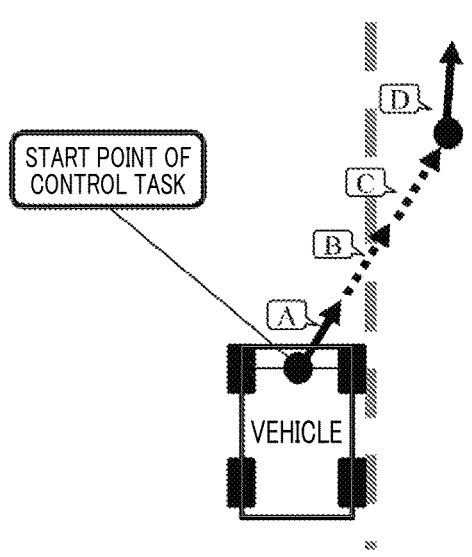
FIG. 19 is a view which demonstrates an image of a target vehicle captured from above which schematically represents a locus of movement of the target vehicle in a lag time between when the image was captured and the present time at a remote side.

How to create the arrow-shaped icons 140A and 140D used in the fourth embodiment will be described below. FIG. 19 demonstrates an image of the vehicle 10 captured from above which schematically illustrates a locus of movement of the vehicle 10 in a lag time between when the image was captured in the vehicle 10 and the present time at the remote side. In the illustrated example, the control information about each of the control tasks B and C is produced in a period of time between when the control information about the control task A which is to be executed in the vehicle 10 when an image is captured in the vehicle 10 was produced at the remote side and when the control information about the control task D is currently produced at the remote side. The vehicle 10 is scheduled to move according to a sequence of the tasks A to C.

Assuming that arrows associated with the control tasks A to D are drawn on the ground on the image, three-dimensional coordinates of a base and a head of each of arrows when the image was captured in the vehicle 10, in other words, the control task A was being executed and the present time when the control task D is produced are calculated. The base of each of the arrows represents the position of the vehicle 10 calculated when the corresponding control task was or will be initiated. The orientation of each of the arrows represents a direction in which the vehicle 10 was or will be controlled to head when the corresponding control task was or will be executed. The length of each of the arrows represents the speed of the vehicle 10 when the corresponding task was or will be executed.

The position, the heading direction, and the speed of the vehicle 10 when the image was captured in the vehicle 10, in other words, when the control task A was executed may be derived using the controlled variable and/or the control information provided when the image was captured. The position, the heading direction, and the speed of the vehicle 10 at the present time, in other words, when the control task D is produced may be calculated as a function of the controlled variables used in the control tasks A to C using a vehicle dynamics model. These parameters may be used to determine the three-dimensional coordinates of the base and the head of each of arrows.

If an arrow which corresponds to the control task A and is drawn on the ground and an arrow which corresponds to the control D and is drawn on the ground is captured by the camera 22, a point at coordinates (X, Y, Z) in a three-dimensional space is converted by perspective projection transformation into a point at coordinates (u, v) on the image. Using such a technique, positions of the arrow-shaped icons 140A and 140D may be determined on an image displayed at the remote side.

Figure 20:
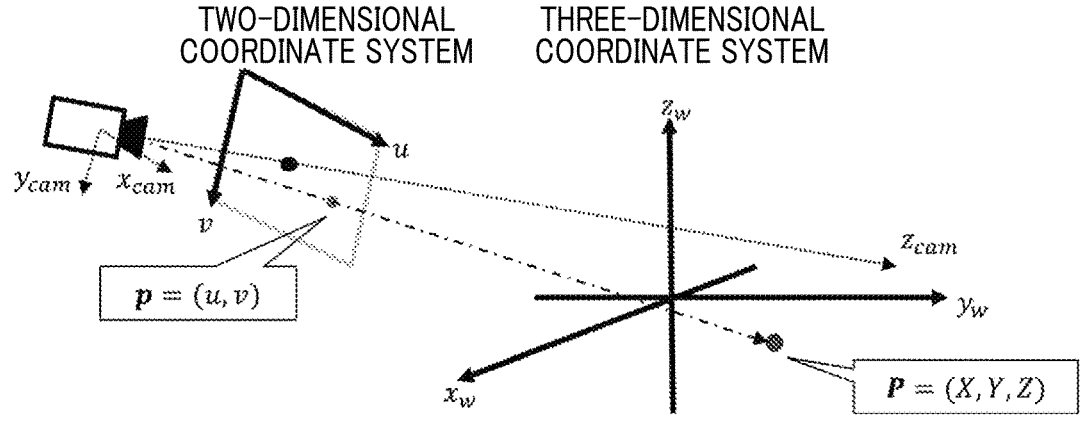
FIG. 20 is a view for explaining perspective projection transformation.

For instance, the perspective projection transformation using a pin-hole camera mode is capable of performing a coordinate transformation according to an equation below. External parameters are expressed in the form of a matrix in order to transform a global coordinate system (i.e., a three-dimensional coordinate system illustrated in FIG. 20) into a camera coordinate system (i.e., a coordinate system denoted by $x_{cam}$, $y_{cam}$, and $z_{cam}$ in FIG. 20), while internal parameters are expressed in the form of a matrix in order to transform the camera coordinate system into an image coordinate system (i.e., a two-dimensional coordinate system illustrated in FIG. 20). The matrixes P, A, [R|t] shown below may be derived using information about calibration or alignment of a camera.

$$sm' = PM' = A[R \mid t]M'$$

where M' is global coordinates [X, Y, Z, 1], m' is image coordinates [u, v, 1], s is a scale factor, P is a perspective projection matrix, A denotes internal parameters, and [R|t] denotes external parameters.

As apparent from the above discussion, the fourth embodiment offers substantially the same beneficial advantages as those in the first embodiment and also has a unique effect that the use of the arrow-shaped icons in which the orientations of the arrows represent directions in which the vehicle was heading or expected to head in future enables the remote driver D to immediately perceive the contents of the controlled variables and also to visually perceive the present position of the vehicle 10 with a sense of reality.

Fifth Embodiment

The fifth embodiment will be described below which is different only in structure of the auxiliary image from the first embodiment. Other arrangements are identical, and explanation thereof in detail will be omitted here.

Figure 21A:
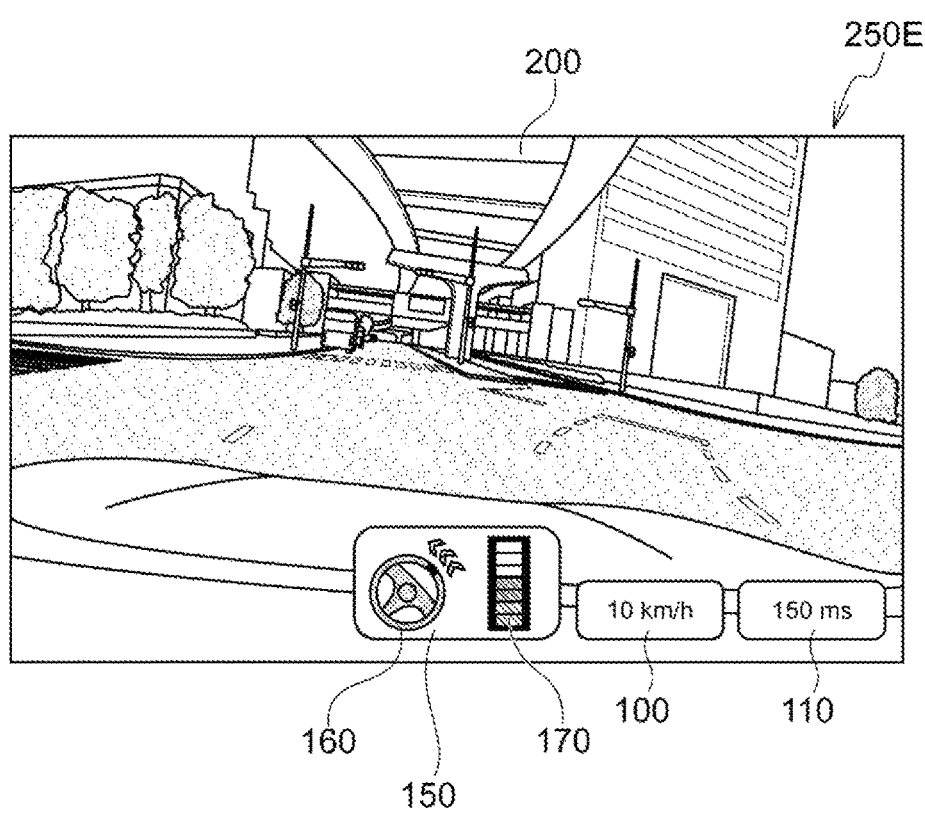
FIG. 21A is a view which demonstrates an example of an image on which an auxiliary image is overlaid which includes a deviation indicator which represents a deviation between a past piece of control information used when an image was captured in a target vehicle and a present piece of control information produced most recently.

The auxiliary image in the fifth embodiment, as illustrated in FIG. 21A, includes the variable deviation indicator 150 representing a deviation between controlled variables, the vehicle speed indicator 100, and the displaying lag time indicator 110. The variable deviation indicator 150 represents a deviation of a present controlled steering variable from a past controlled steering variable provided when an image was captured by the camera 22 in the vehicle 10. The variation deviation indicator 150 includes the variable deviation-indicating icons 160 and 170. The variable deviation-indicating icon 160 represents a deviation between a past controlled steering variable provided when the image was captured in the vehicle 10 and a present controlled steering variable produced currently. The variable deviation-indicating icon 170 represents a deviation between a past controlled acceleration/deceleration variable provided when the image was captured in the vehicle 10 and a present controlled acceleration/deceleration variable produced currently The variable deviation-indicating icon 160, as clearly illustrated in FIG. 21B, includes the mark 162 and the indicator 166. The mark 162 is expressed by a steering wheel motif representing a turn angle of the steering wheel. The indicator 166 represents a deviation between a direction in which the vehicle 10 was being steered when the image was captured in the vehicle 10 and a direction in which the vehicle 10 is expected to be steered at the present time and a deviation between a steered angle by which the vehicle 10 was being steered when the image was captured in the vehicle 10 and a steered angle by which the vehicle 10 is expected to be steered at the present time. The mark 162 has the reference mark 164 displayed thereon. The variable deviation-indicating icon 170 includes the background 172 and the indicator 174 representing a position of a pedal.

The auxiliary image in the first embodiment, as described above, includes two sets of icons: one including the past controlled steering variable-indicting icon 80A and the present controlled steering variable-indicating icon 80D and one including the past controlled acceleration/deceleration variable-indicating icon 90A and the present controlled acceleration/deceleration variable-indicating icon 90D, while, the auxiliary image in the fifth embodiment includes a single set of icons: the controlled steering variable deviation-indicating icon 160 and the controlled acceleration/deceleration variable-indicating icon 170.

Figure 21B:
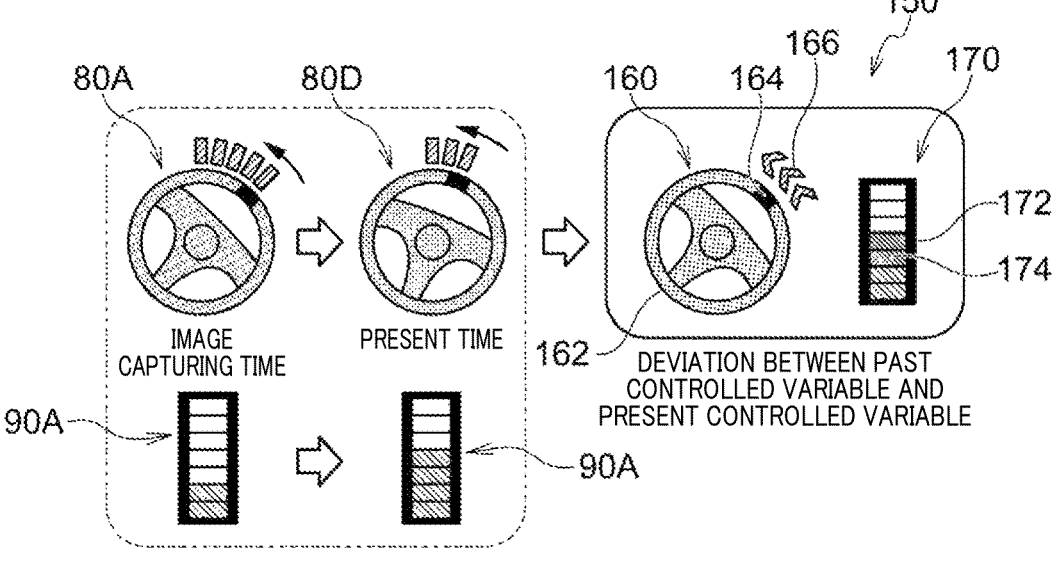
FIG. 21B is a view which demonstrates a comparison between indicators representing a past piece of control information used when an image was captured in a target vehicle and a present piece of control information produced latterly.

In an example illustrated in FIG. 21B, the steering wheel when the image was captured in the vehicle 10 is, as indicated by the past parameter-indicating icon 80A, viewed to be oriented to the right, while the steering wheel at the present time is, as indicated by the present parameter-indicating icon 80D, viewed to be returned back to the left. The indicator 166 of the icon 160 represents that the steering wheel is returned back to the left. The accelerator pedal is, as indicated by the past parameter-indicating icon 90A, viewed to be at the second position when the image was captured in the vehicle 10, while the accelerator pedal is, as indicated by the present parameter-indicating icon 90D, viewed to be at the fourth position at the present time. The controlled acceleration/deceleration variable-indicating icon 170 indicates a present controlled variable (i.e., the fourth position of the accelerator pedal) and an increment in controlled variable (i.e., a two-position increment of the accelerator pedal) in different colors in order to emphasize a deviation between the past and present controlled acceleration/deceleration variables, i.e., the fact that the accelerator pedal is expected to be depressed in the vehicle 10.

As apparent from the above discussion, the fifth embodiment overlays an icon representing past and present controlled variables on an image displayed in the remote assistance device 40, thereby enabling the remote driver D to immediately perceive a gap between the past and present controlled variables. The fifth embodiment is also capable of simplifying the structure of the auxiliary image as compared with the case where two icons: one representing a past controlled variable and one representing a present controlled variable are overlaid on the image displayed in the remote assistance device 40.

Sixth Embodiment

The sixth embodiment will be described below which is different only in structure of the auxiliary image from the first embodiment. Other arrangements are identical, and explanation thereof in detail will be omitted here.

Figure 22A:
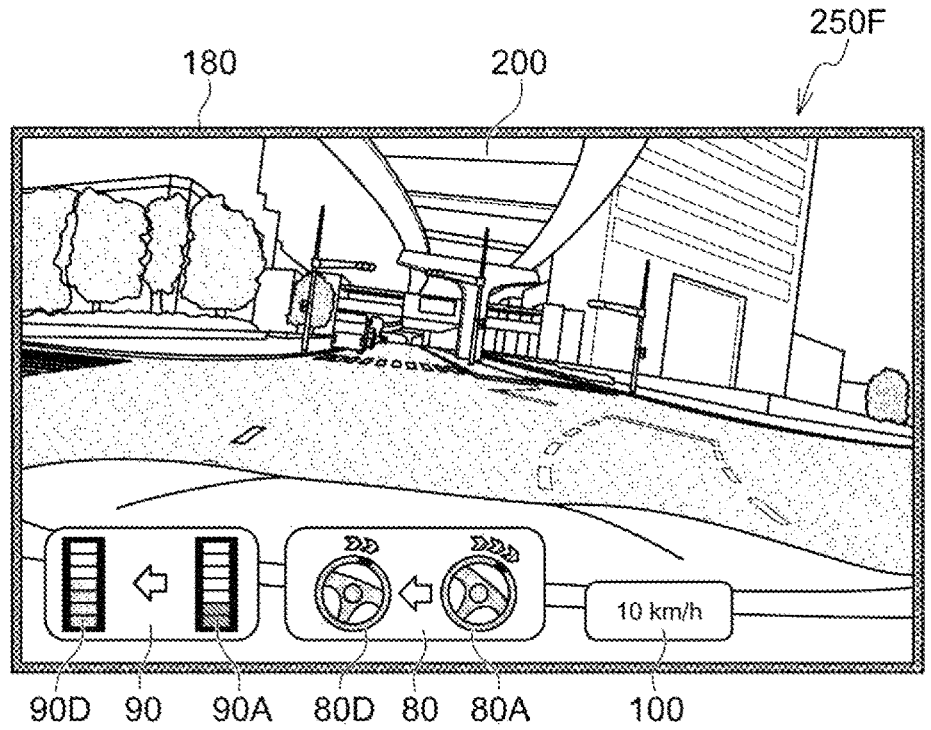
FIG. 22A is a view which demonstrates an example of an image on which indicators representing time lags are overlaid according to an embodiment in this disclosure.
Figure 22B:
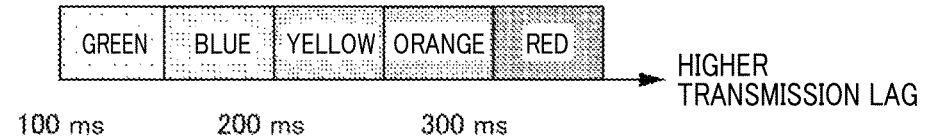
FIG. 22B is a graph which shows a relationship between a set of colors of a frame and a length of lag time.

The auxiliary image in the sixth embodiment, as illustrated in FIG. 22A, includes the controlled steering variable indicator 80, the controlled acceleration/deceleration variable indicator 90, the vehicle speed indicator 100, and the image-transmission lag indicator 180. The image-transmission lag indicator 180 is, unlike in the first embodiment, designed to be of a frame shape representing a lag time using a set of square block marks which sequentially turn in different colors on the displayed image 250F instead of numeral numbers. The lag time (which is referred to as the image transmission lag in the above discussion) is caused by transmission of image data from the vehicle 10 to the remote assistance device 40. The square block marks, as can be seen in FIG. 22B, turn from green, to blue, to yellow, to orange, and to red with an increase in image transmission lag.

As apparent from the above discussion, the sixth embodiment offers substantially the same beneficial advantages as in the first embodiment and also has a unique effect that the remote driver D is enabled to detect a change in colors of the square block marks to immediately perceive an increase or decrease in image transmission delay.

Seventh Embodiment

The seventh embodiment will be described below which is different from the first embodiment in that the auxiliary image is displayed only when the image transmission lag increases. Other arrangements are identical, and explanation thereof in detail will be omitted here.

Figure 23:
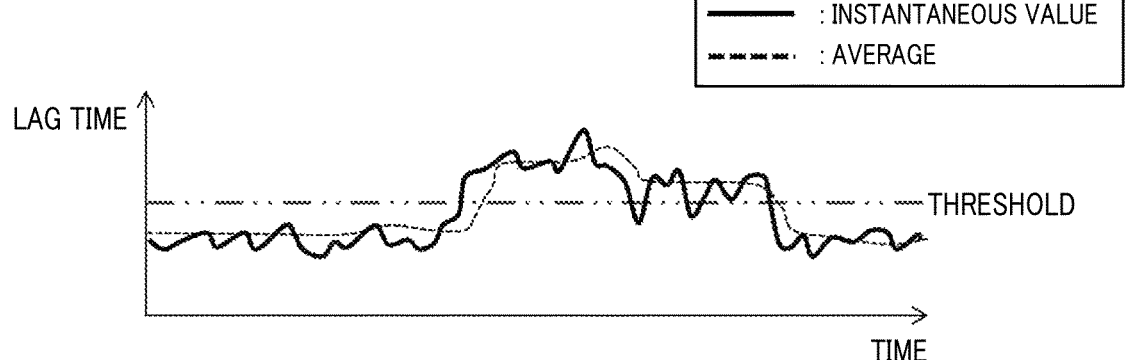
FIG. 23 is a graph which represents a variation in lag time.

The image transmission lag is, as clearly illustrated in FIG. 23, usually variable depending upon a state of communication between the remote side and the vehicle 10. The information processing unit 42 of the remote assistance device 40 in the seventh embodiment is designed to monitor the image transmission lag and works to overlay the auxiliary image on the image displayed to the remote driver D only when the image transmission lag exceeds a given threshold.

For instance, in step S408 illustrated in FIG. 8, the CPU 42A may work to overlay the auxiliary image on the image displayed to the remote driver D only when the image transmission lag is determined to be higher than a given threshold. When the image transmission lag is lower than the threshold, it is desirable not to show the auxiliary image to make the remote driver D concentrate on the remote driving of the vehicle 10.

Figure 24:
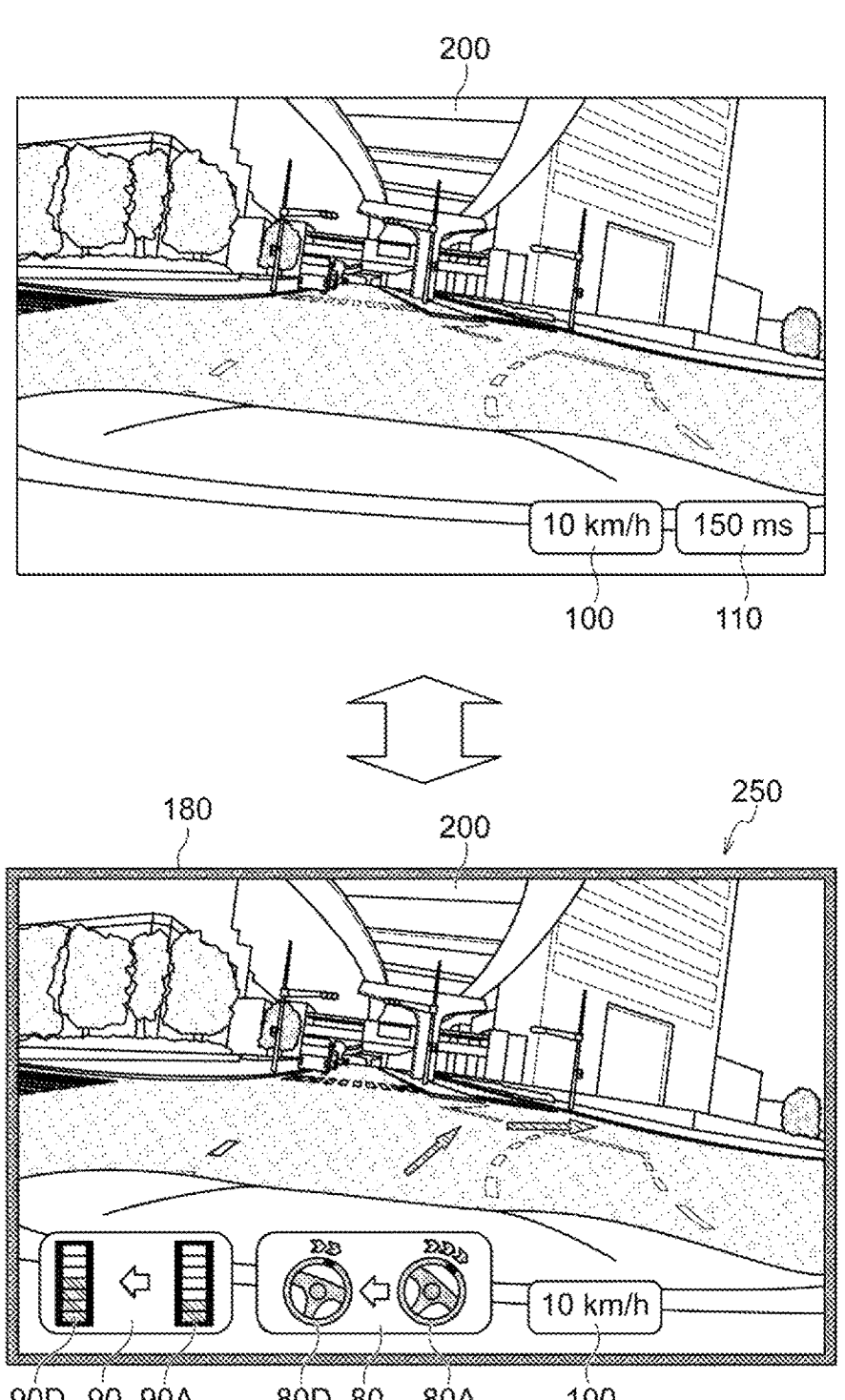
FIG. 24 is a schematic view which demonstrates a comparison between images on which an auxiliary image is overlaid and inhibited from being overlaid.

The contents (e.g., types, positions, and/or number of icons) of the auxiliary image may be altered without inhibiting the auxiliary image from being overlaid on the image displayed to the remote driver D. For instance, when the image transmission lag is, as demonstrated in FIG. 24, lower than a given threshold, the vehicle speed indicator 100 representing the speed of the vehicle 10 when the image was captured and the lag indicator 110 of the image transmission lag (e.g., expressed by a numerical number) may be overlaid in the form of the auxiliary image on the original image 200 displayed to the remote driver. Alternatively, when the image transmission lag is higher than the given threshold, the controlled steering variable indicator 80, the controlled acceleration/deceleration variable indicator 90, the past parameter-indicating icon 140A which is of an arrow shape and represents a heading direction of the vehicle 10 when the image was captured in the vehicle 10, the present parameter-indicating icon 140D which is of an arrow shape and represents a heading direction in which the vehicle 10 is expected to head at the present time, the vehicle speed indicator 100 representing the speed of the vehicle 10 when the image was captured in the vehicle 10, and the lag indicator 180 which is shown in the form of a frame and representing the image transmission lag may be overlaid as the auxiliary image on the original image 200.

When the image transmission lag rises above or drops below the threshold at frequent intervals, it will cause the auxiliary image to appear or disappear on the original image 200 at decreased intervals, thus causing the remote driver D to feel discomfort. In order to alleviate such a problem, a determination of whether the image transmission lag is higher than the threshold may be made using an instantaneous value of the image transmission lag, while a determination of whether the image transmission lag is lower than the threshold may be made using an average value of the image transmission lag calculated in a time interval in which the vehicle 10 travels a selected distance. A variation in average value of the image transmission lag is usually smaller than that in instantaneous value of the image transmission lag, thereby resulting in a decreased number of times the auxiliary image is displayed on the original image 200.

As apparent from the above discussion, the seventh embodiment offers substantially the same beneficial advantages as those in the first embodiment and is capable of displaying or erasing the auxiliary image on or from the image displayed to the remote driver D or changing the contends of the auxiliary image as a function of a measure of the image transmission lag, thereby ensuring the power of concentration of the remote driver D.

Modifications

This disclosure is not limited to the above embodiments, however, may be realized by various embodiments without departing from the purpose of the disclosure. This disclosure includes all possible combinations of the features of the above embodiments or features similar to the parts of the above embodiments.

Some of the above embodiments may be combined as needed.

In each of the above embodiments, the image data and the linking information are transmitted to the remote side in the form of discrete data streams, but however, the image data to which the linking information is added may be transmitted to the remote side. Additionally, the image data to which the control ID is added may also be transmitted to the remote side, thereby eliminating the need for identification of the control ID using the timestamps.

For instance, the steps of each of the above-described programs may be altered in sequence, partially omitted, or have an additional step(s) without departing from the purpose of the disclosure. Each of the above embodiments is designed to use a software structure to perform the control tasks in the computer, but however, the control tasks may be performed using a hardware structure or a combination of software and hardware structures.

Each the above embodiments may be modified to execute the above-described programs using processors instead of the CPUs 20A and 42A. For instance, the processors may be implemented by PLDs (Programmable Logic Devices), such as FPGAs (Field-Programmable Gate Arrays) which have reconfigurable digital circuits after they are manufactured. Each of the processors may alternatively be designed to have an electrical circuit, such as an ASIC (Application-Specific Integrated Circuit), customized for a particular use.

Each of the above programs may be executed using only one or two or more (e.g., FPGAs or a combination of a CPU and an FPGA) of all possible different types of processors. Such processors may be realized by electrical circuits fabricated using semiconductor devices.

Each of the above embodiments is configured to have the programs which are installed in the storage devices, but however, may alternatively be installed in a non-transitory memory, such as a CD-ROM (Compact Disk Read Only Memory), a DVD-ROM (Digital Versatile Disk Read Only Memory), a USB (Universal Serial Bus) memory, or a semiconductor memory. The programs may also be downloaded from an external device using a network.

What is claimed is:

1. A remote assistance method in which a vehicle works to obtain image information including an image of a surround view of a target vehicle which is captured by an image capturing device and transmits the image information to a remote assistance device, to receive control information from the remote assistance device to control an operation of the target vehicle using the control information, and to generate linking information which links the image information with the control information provided when the image was captured and transmit the linking information to the remote assistance device, and in which the remote assistance device works to obtain, from the target vehicle, the image information representing the image of the surround view of the target vehicle, to cyclically produce control information including a controlled variable which is created by an operation input from a remote driver to control a given operation of the target vehicle, to transmit the control information to the target vehicle, to obtain the linking information which links the image information with the control information provided when the image was captured, to analyze the linking information to identify the control information which was provided when the image was captured and pertains to the image shown on a display, and to overlay an auxiliary image on the image shown on the display, the auxiliary image including at least the controlled variable provided when the image was captured in the target vehicle and being used for assisting the remote driver in remotely maneuvering the target vehicle.

* * * * *